United States Patent
Tapucu et al.

(10) Patent No.: US 12,332,359 B2
(45) Date of Patent: Jun. 17, 2025

(54) DETECTION AND ESTIMATION OF DIRECT AND REFLECTED NAVIGATION SATELLITE SIGNAL PARAMETERS IN A MULTIPATH ENVIRONMENT

(71) Applicant: Avago Technologies International Sales Pte. Limited, Singapore (SG)

(72) Inventors: Emre Tapucu, San Jose, CA (US); Dmitry Kuznetsov, Irvine, CA (US)

(73) Assignee: Avago Technologies International Sales Pte. Limited, Palo Alto, CA (US)

(*) Notice: Subject to any disclaimer, the term of this patent is extended or adjusted under 35 U.S.C. 154(b) by 550 days.

(21) Appl. No.: 17/730,933

(22) Filed: Apr. 27, 2022

(65) Prior Publication Data
US 2023/0350075 A1    Nov. 2, 2023

(51) Int. Cl.
*G01S 19/22* (2010.01)
*G01S 19/30* (2010.01)
(Continued)

(52) U.S. Cl.
CPC ............. *G01S 19/22* (2013.01); *G01S 19/30* (2013.01); *G01S 19/37* (2013.01); *H04B 1/7075* (2013.01);
(Continued)

(58) Field of Classification Search
CPC ........ G01S 19/22; G01S 19/246; G01S 19/29; G01S 19/30; G01S 19/37; G01S 19/428;
(Continued)

(56) References Cited

U.S. PATENT DOCUMENTS

| | | | |
|---|---|---|---|
| 6,366,599 B1 * | 4/2002 | Carlson ................... | G01S 19/30 375/130 |
| 7,760,139 B1 * | 7/2010 | Gorski-Popiel ......... | G01S 19/37 342/357.77 |

(Continued)

FOREIGN PATENT DOCUMENTS

| | | | | |
|---|---|---|---|---|
| WO | WO-2010066729 A1 * | 6/2010 | ............. | G01S 19/30 |
| WO | WO-2019-219218 A1 | 11/2019 | | |

OTHER PUBLICATIONS

F. van Diggelen, Indoor GPS Technology, CTIA Wireless, p. 1-10 (Year: 2001).*

(Continued)

*Primary Examiner* — Bernarr E Gregory
*Assistant Examiner* — Fred H Mull
(74) *Attorney, Agent, or Firm* — Quarles & Brady LLP

(57) ABSTRACT

Novel tools and techniques are provided for implementing detection and estimation of direct and reflected navigation satellite (e.g., global navigation satellite system ("GNSS"), etc.) signal parameters in a multipath environment. In various embodiments, logic of semiconductor package that is disposed on a user device concurrently receives a plurality of signals from a satellite(s), each signal travelling along a different path between each satellite(s) and the user device within a multipath environment. The logic identifies two or more signal peaks that fall within a tracking aperture based on analysis of the received signals, and determines peak parameter estimates for each signal peak based on measurements of signal parameters from at least one signal peak. The logic provides the determined peak parameter estimates for each signal peak to a position engine ("PE") of the user device to calculate a navigation solution (e.g., position, velocity, and/or time, etc.) for the user device.

20 Claims, 18 Drawing Sheets

(51) Int. Cl.
  *G01S 19/37* (2010.01)
  *H04B 1/7075* (2011.01)
  *H04B 1/7083* (2011.01)
  *H04B 1/7087* (2011.01)
  *H04B 1/711* (2011.01)
(52) U.S. Cl.
  CPC ....... *H04B 1/70755* (2013.01); *H04B 1/7083* (2013.01); *H04B 1/7087* (2013.01); *H04B 1/711* (2013.01)
(58) Field of Classification Search
  CPC .............. H04B 1/7075; H04B 1/70755; H04B 1/7083; H04B 1/7087; H04B 1/711
  See application file for complete search history.

(56) References Cited

U.S. PATENT DOCUMENTS

| | | | | |
|---|---|---|---|---|
| 2007/0206663 | A1* | 9/2007 | Grover | H04B 1/70775 375/147 |
| 2009/0303123 | A1* | 12/2009 | Chen | G01S 19/37 342/357.31 |
| 2010/0176990 | A1* | 7/2010 | Green | G01S 19/428 342/357.62 |
| 2011/0032920 | A1* | 2/2011 | Subverviola | H04B 1/7075 370/479 |
| 2014/0009333 | A1 | 1/2014 | Ahmed et al. | |
| 2020/0371247 | A1 | 11/2020 | Marmet | |
| 2021/0132236 | A1* | 5/2021 | Cookman | G01S 19/22 |
| 2021/0199812 | A1* | 7/2021 | Cheng | G01S 19/22 |
| 2022/0137234 | A1* | 5/2022 | Syrjärinne | G01S 19/22 342/357.61 |

OTHER PUBLICATIONS

L.R. Weill, GNSS Solutions: Differences between Signal Acquisition and Tracking, InsideGNSS, p. 22-27 (Year: 2011).*
Extended European Search Report, EP Application No. 23155791.9, European Patent Office, report dated Sep. 13, 2023, 11 pages.
Xie, Peng et al., Measuring GNSS Multipath Distributions in Urban Canyon Environments, IEEE USA, vol. 64, No. 2, dated Feb. 1, 2015, pp. 366-377.

* cited by examiner

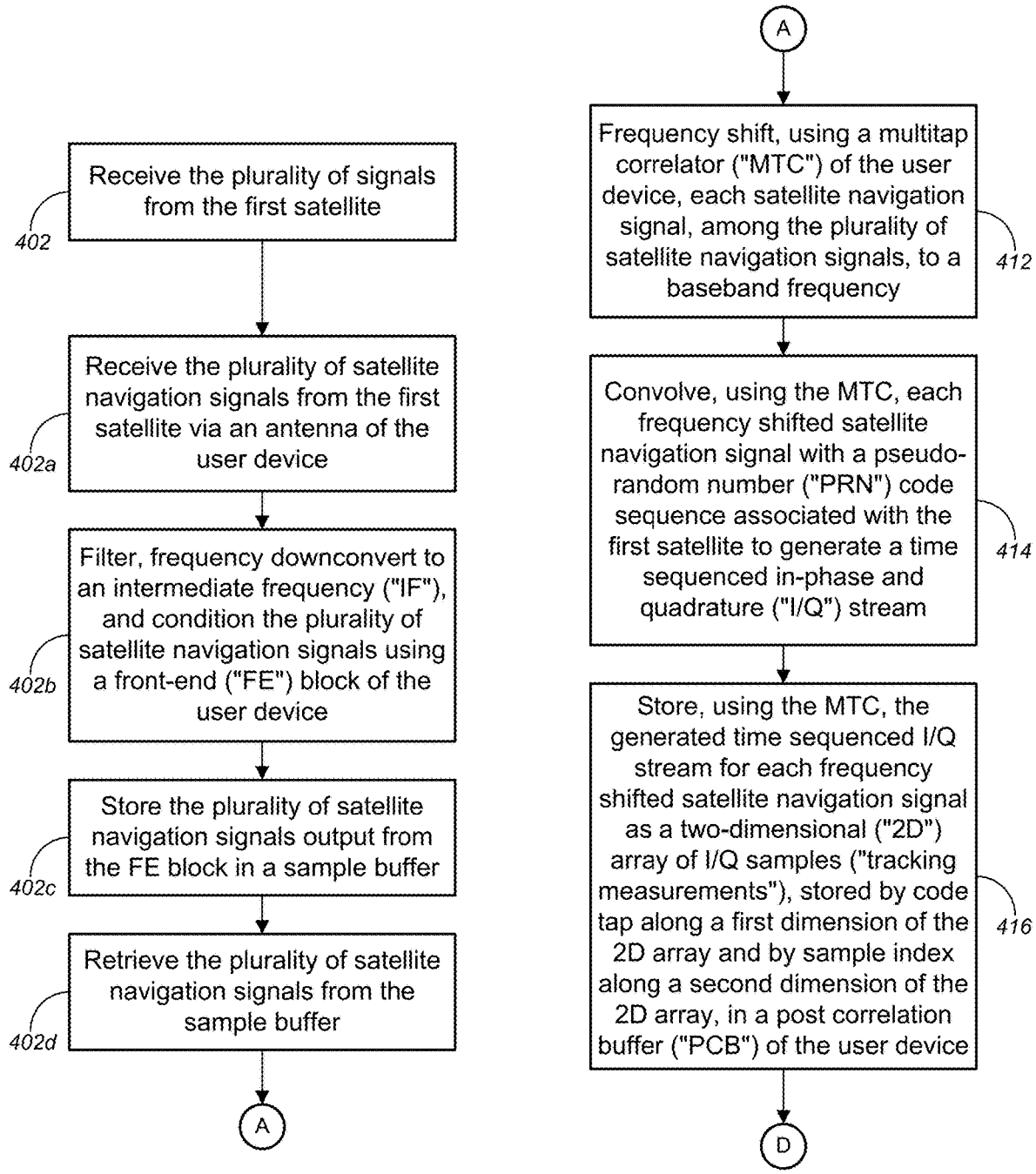
400 Fig. 4B    400 Fig. 4C

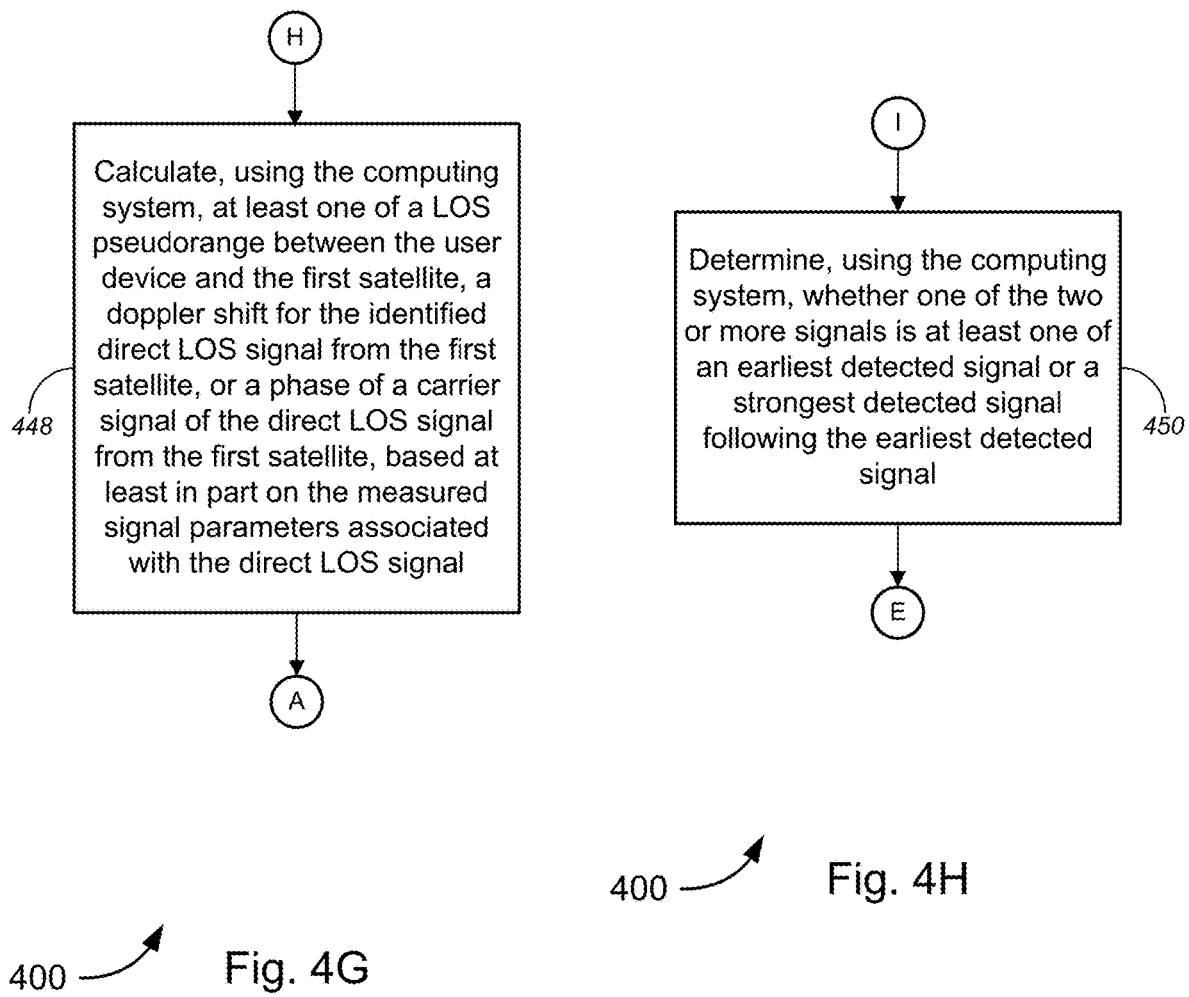

DETECTION AND ESTIMATION OF DIRECT AND REFLECTED NAVIGATION SATELLITE SIGNAL PARAMETERS IN A MULTIPATH ENVIRONMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing geographical location determination using navigation satellites, and, more particularly, to methods, systems, and apparatuses for implementing detection and estimation of direct and reflected navigation satellite (e.g., global navigation satellite system ("GNSS"), etc.) signal parameters in a multipath environment.

BACKGROUND

Multipath ("MP") signals are a key error source for GNSS receivers. In urban environments, the GNSS receiver can observe the direct line-of-sight ("LOS") signal from a satellite, and/or one or more non-line-of-sight ("NLOS") signals that reflect off neighboring objects (e.g., buildings). The measurement engine ("ME") in a GNSS navigation receiver is responsible for providing the position engine ("PE") with unbiased LOS pseudorange, Doppler, and carrier phase measurements. In multipath environments, the ME can produce biased measurements (which are subsequently sent to the PE) due to the MP signals, resulting in poor accuracy in the navigation solution. This is compounded by the fact that, in conventional GNSS receivers, each tracking channel provides only a single set of measurements.

Hence, there is a need for more robust and scalable solutions for implementing geographical location determination using navigation satellites, and, more particularly, to methods, systems, and apparatuses for implementing detection and estimation of direct and reflected navigation satellite (e.g., GNSS, etc.) signal parameters in a multipath environment.

SUMMARY

The techniques of this disclosure generally relate to tools and techniques for implementing geographical location determination using navigation satellite, and, more particularly, to methods, systems, and apparatuses for implementing detection and estimation of direct and reflected navigation satellite (e.g., GNSS, etc.) signal parameters in a multipath environment.

In an aspect, a semiconductor package is provided that is disposed within a user device. The semiconductor package comprises logic that is configured to: identify two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the user device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture; determine one or more peak parameter estimates for each of the at least one signal peak based on measurement of signal parameters from at least one signal peak among the identified two or more signal peaks; and provide the determined one or more peak parameter estimates for each of the at least one signal peak to a position engine ("PE") of the user device that is configured to calculate a navigation solution for the user device based at least in part on the determined one or more peak parameter estimates.

In some embodiments, the logic is further configured to: frequency shift each satellite signal, among the plurality of satellite signals, to a baseband frequency; convolve each frequency shifted satellite signal with a pseudo-random number ("PRN") code sequence associated with the first satellite to generate a time sequenced in-phase and quadrature ("I/Q") stream, wherein the time sequenced baseband I/Q stream comprises a plurality of I/Q sample streams with each I/Q sample stream being code phase shifted from a central or prompt phase by multiples of a tap spacing, wherein the tap spacing corresponds to a code delay based on the PRN code sequence, wherein the multiples of the tap spacing collectively correspond to a plurality of code taps, which are defined by a plurality of PRN code offsets, wherein each I/Q sample stream corresponds to code phase shifted I/Q signals over a predetermined integration ("PDI") time; and store the generated time sequenced baseband I/Q stream for each frequency shifted signal as a two-dimensional ("2D") array of I/Q samples, stored by code tap along a first dimension of the 2D array and by post correlation sample index along a second dimension of the 2D array, in a post correlation buffer ("PCB") of the satellite navigation device.

According to some embodiments, the logic is further configured to: generate a 2D array of grid energy values that coherently and non-coherently integrates over a programmable duration, a plurality of frequency bins, and a programmable bin spacing for all code taps produced by the MTC, by implementing a three-level iteration loop comprising an outermost loop, an intermediate level loop, and an innermost loop, wherein implementing the three-level iteration loop comprises repeating the following for each of the plurality of frequency bins for each of the plurality of code taps: using the outermost loop to select a code tap, among the plurality of code taps that is stored in the PCB, to input into the GP; using the intermediate level loop to select a bin frequency to apply to the selected code tap; and using the innermost loop to process an I/Q sample stream corresponding to the selected code tap through the GP to produce a current scalar grid energy value for the selected code tap and the selected frequency bin; and store or store and accumulate the current scalar grid energy value for each of the plurality of frequency bins for each of the plurality of code taps, stored by code tap along a first dimension of the 2D array and by frequency bin along a second dimension of the 2D array, in an energy grid buffer ("EGB") of the satellite navigation device.

In some embodiments, the logic is further configured to: identify at least one location within the EGB in which an energy peak occurs, wherein each energy peak corresponds to a current scalar grid energy value that exceeds a predetermined energy threshold value, wherein each identified location among the at least one location within the EGB corresponds to a code tap and a frequency bin associated with each energy peak; determine at least one signal parameter estimate corresponding to each energy peak, the at least one signal parameter estimate comprising at least one of a peak coarse frequency estimate, a refined peak code phase estimate using peak fit, or a refined peak signal strength ("$CN_o$") estimate; and store a list of identified energy peaks and corresponding determined at least one signal parameter estimate in a multipeak report ("MPR") buffer.

According to some embodiments, the logic is further configured to: identify a nearest code tap in the PCB corresponding to each identified energy peak, based on the list of identified energy peaks and corresponding determined at least one signal parameter estimate that are stored in the MPR buffer; apply at least one algorithm to the I/Q sample corresponding to the identified nearest code tap to refine at least one of frequency estimates, phase estimates, or navigation data bit estimates, wherein the at least one algorithm comprises at least one of a phase lock loop ("PLL") algorithm, a frequency lock loop ("FLL") algorithm, or an open loop lag-N complex cross product algorithm; and store the refined at least one of the frequency estimates, the phase estimates, or the navigation data bit estimates in the MPR buffer, wherein the refined at least one of the frequency estimates, the phase estimates, or the navigation data bit estimates in the MPR buffer corresponds to the one or more peak parameter estimates. In some cases, providing the determined one or more peak parameter estimates for each of the at least one signal peak to the PE comprises sending the refined at least one of the frequency estimates, the phase estimates, or the navigation data bit estimates to the PE.

In some embodiments, based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, the logic is further configured to: analyze the determined at least one signal parameter estimate corresponding to an energy peak for each reflected NLOS signal to determine relative MP bias for each reflected NLOS signal relative to the direct LOS signal; in response to a subsequent determination that the direct LOS signal has been lost, adjust at least one of the one or more reflected NLOS signals to serve as corresponding at least one pseudo-LOS signal, by bias correcting based on the determined relative MP bias for each reflected NLOS signal; and in response to a later determination that the direct LOS signal has again been detected and reacquired, replace the at least one pseudo-LOS signal with the reacquired direct LOS signal.

According to some embodiments, based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, the logic is further configured to: in response to a determination that the direct LOS signal has been lost, determine a predicted code tap and a predicted frequency bin corresponding to the lost direct LOS signal, based on an extrapolation of the identified at least one location within the EGB corresponding to the direct LOS signal prior to being lost, and generate a pseudo-LOS signal based on the determined predicted code tap and the determined predicted frequency bin; and in response to a later determination that the direct LOS signal has again been detected and reacquired, replace the pseudo-LOS signal with the reacquired direct LOS signal.

In some embodiments, the plurality of signals comprises global navigation satellite system ("GNSS") signals, wherein the signal parameters from the received plurality of signals comprise at least one of signal power, code delay, carrier phase, carrier frequency, or data bits, and/or the like.

According to some embodiments, the logic is further configured to: determine whether one of the two or more signals is a direct line-of-sight ("LOS") signal instead of one or more reflected non-line-of-sight ("NLOS") signals received from the first satellite; and calculate at least one of a LOS pseudorange between the user device and the first satellite, a Doppler shift for the identified direct LOS signal from the first satellite, or a phase of a carrier signal of the direct LOS signal from the first satellite, based at least in part on the measured signal parameters associated with the direct LOS signal. In some cases, the determined one or more peak parameter estimates for each of the at least one signal peak comprise the calculated at least one of the LOS pseudorange, the Doppler shift for the identified direct LOS signal, or the phase of the carrier signal of the direct LOS signal, and/or the like.

In some embodiments, the logic is further configured to: determine whether one of the two or more satellite signals is at least one of an earliest detected signal or a strongest detected signal following the earliest detected signal, wherein the at least one of an earliest detected signal or a strongest detected signal following the earliest detected signal corresponds to the at least one signal peak.

According to some embodiments, the user device communicatively couples with two or more satellites, and identifying the two or more signal peaks that fall within the tracking aperture comprises identifying two or more signal peaks that fall within the tracking aperture spanning the first set of code delay values along the first dimension and the first set of frequency offset values along the second dimension based on analysis of a plurality of satellite signals received from each of the two or more satellites, each of the plurality of satellite signals travelling along a different path between each satellite among the two or more satellites and the user device within the MP environment, the identified two or more signal peaks corresponding to two or more satellite signals, among the plurality of satellite signals, for each satellite that are correlated with two or more satellite signals, among the plurality of satellite signals, for other satellites among the two or more satellites.

In some embodiments, the logic is further configured to: collect measurements from both high chipping rate bands and low chipping rate bands from the received plurality of satellite signals from the first satellite; analyze the collected measurements for the high chipping rate bands to identify and inflate any uncertainties of the low chipping rate bands; and in response to identifying and inflating uncertainties of at least one low chipping rate band, flag the at least one low chipping rate band in terms of a level of multipath measurement bias based on the identified and inflated uncertainties of the at least one low chipping rate band.

According to some embodiments, the plurality of signals is continuously received from the first satellite, and wherein identifying the two or more signal peaks, determining the one or more peak parameters, and providing the determined one or more peak parameter estimates for each of the at least one signal peak to the PE are performed continuously over time.

In another aspect, a method comprises identifying, using a computing system of a user device, two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the user device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture; determining, using the computing system, one or more peak parameter estimates for each of the at least one signal peak based on measurement of signal parameters from at least one signal peak among the identified two or more signal peaks; and providing, using the computing system, the determined one or more peak parameter estimates for each of the at least one signal peak to a position engine ("PE") of the user device that is configured to calculate a navigation solution for the user device based at least in part on the determined one or more peak parameter estimates.

In some embodiments, the computing system comprises at least one of a multitap correlator ("MTC"), a grid processor ("GP"), a signal peak detector ("PD"), a peak parameter estimator ("PPE"), a measurement engine ("ME"), a digital signal processor ("DSP"), or other processor, and/or the like.

According to some embodiments, the method further comprises frequency shifting, using the computing system, each signal, among the plurality of signals, to a baseband frequency; convolving, using the computing system, each frequency shifted signal with a pseudo-random number ("PRN") code sequence associated with the first satellite to generate a time sequenced baseband in-phase and quadrature ("I/Q") stream, wherein the time sequenced baseband I/Q stream comprises a plurality of I/Q sample streams with each I/Q sample stream being code phase shifted from a central or prompt phase by multiples of a tap spacing, wherein the tap spacing corresponds to a code delay based on the PRN code sequence, wherein the multiples of the tap spacing collectively correspond to a plurality of code taps, which are defined by a plurality of PRN code offsets, wherein each I/Q sample stream corresponds to code phase shifted I/Q signals over a predetermined integration ("PDI") time; and storing, using the computing system, the generated time sequenced baseband I/Q stream for each frequency shifted signal as a two-dimensional ("2D") array of I/Q samples, stored by code tap along a first dimension of the 2D array and by post correlation sample index along a second dimension of the 2D array, in a post correlation buffer ("PCB") of the user device.

In some embodiments, the method further comprises generating, using the computing system, a 2D array of grid energy values that coherently and non-coherently integrates over a programmable duration, a plurality of frequency bins, and a programmable bin spacing for all code taps produced by the computing system, by implementing a three-level iteration loop comprising an outermost loop, an intermediate level loop, and an innermost loop, wherein implementing the three-level iteration loop comprises repeating the following for each of the plurality of frequency bins for each of the plurality of code taps: using the outermost loop to select a code tap, among the plurality of code taps that is stored in the PCB; using the intermediate level loop to select a bin frequency to apply to the selected code tap; and using the innermost loop to process an I/Q sample stream corresponding to the selected code tap to produce a current scalar grid energy value for the selected code tap and the selected frequency bin; and storing or storing and accumulating, using the computing system, the current scalar grid energy value for each of the plurality of frequency bins for each of the plurality of code taps, stored by code tap along a first dimension of the 2D array and by frequency bin along a second dimension of the 2D array, in an energy grid buffer ("EGB") of the user device.

According to some embodiments, the method further comprises identifying, using the computing system, at least one location within the EGB in which an energy peak occurs, wherein each energy peak corresponds to a current scalar grid energy value that exceeds a predetermined energy threshold value, wherein each identified location among the at least one location within the EGB corresponds to a code tap and a frequency bin associated with each energy peak, wherein the energy peak corresponds to each of the at least one signal peak, wherein the code tap and the frequency bin associated with each energy peak corresponds to the relative code delay and the relative frequency offset, respectively of a signal, among the two or more signals, corresponding to each of the at least one signal peak; determining, using the computing system, at least one signal parameter estimate corresponding to each energy peak, the at least one signal parameter estimate comprising at least one of a peak coarse frequency estimate, a refined peak code phase estimate using peak fit, or a refined peak signal strength ("C/N$_o$") estimate; and storing, using the computing system, a list of identified energy peaks and corresponding determined at least one signal parameter estimate in a multipeak report ("MPR") buffer.

In some embodiments, the method further comprises identifying, using the computing system, a nearest code tap in the PCB corresponding to each identified energy peak, based on the list of identified energy peaks and corresponding determined at least one signal parameter estimate that are stored in the MPR buffer; applying, using the computing system, at least one algorithm to the I/Q sample corresponding to the identified nearest code tap to refine at least one of frequency estimates, phase estimates, or navigation data bit estimates, wherein the at least one algorithm comprises at least one of a phase lock loop ("PLL") algorithm, a frequency lock loop ("FLL") algorithm, or an open loop lag-N complex cross product algorithm; and storing, using the computing system, the refined at least one of the frequency estimates, the phase estimates, or the navigation data bit estimates in the MPR buffer, wherein the refined at least one of the frequency estimates, the phase estimates, or the navigation data bit estimates in the MPR buffer corresponds to the one or more peak parameter estimates. In some instances, providing the determined one or more peak parameter estimates for each of the at least one signal peak to the PE comprises sending, using the computing system, the refined at least one of the frequency estimates, the phase estimates, or the navigation data bit estimates to the PE.

In yet another aspect, a satellite navigation device is provided. The satellite navigation device comprises: a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to: identify two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the satellite navigation device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture; determine one or more peak parameter estimates for each of the at least one signal peak based on measurement of signal parameters from at least one signal peak among the identified two or more signal peaks; and provide the determined one or more peak parameter estimates for each of the at least one signal peak to a position engine ("PE") of the satellite navigation device that is configured to calculate a navigation solution for the satellite navigation device based at least in part on the determined one or more peak parameter estimates.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4J are flow diagrams illustrating a method for implementing detection and estimation of direct and reflected navigation satellite (e.g., GNSS, etc.) signal parameters in the multipath environment, in accordance with various embodiments.

DETAILED DESCRIPTION

Overview

Figure 1:
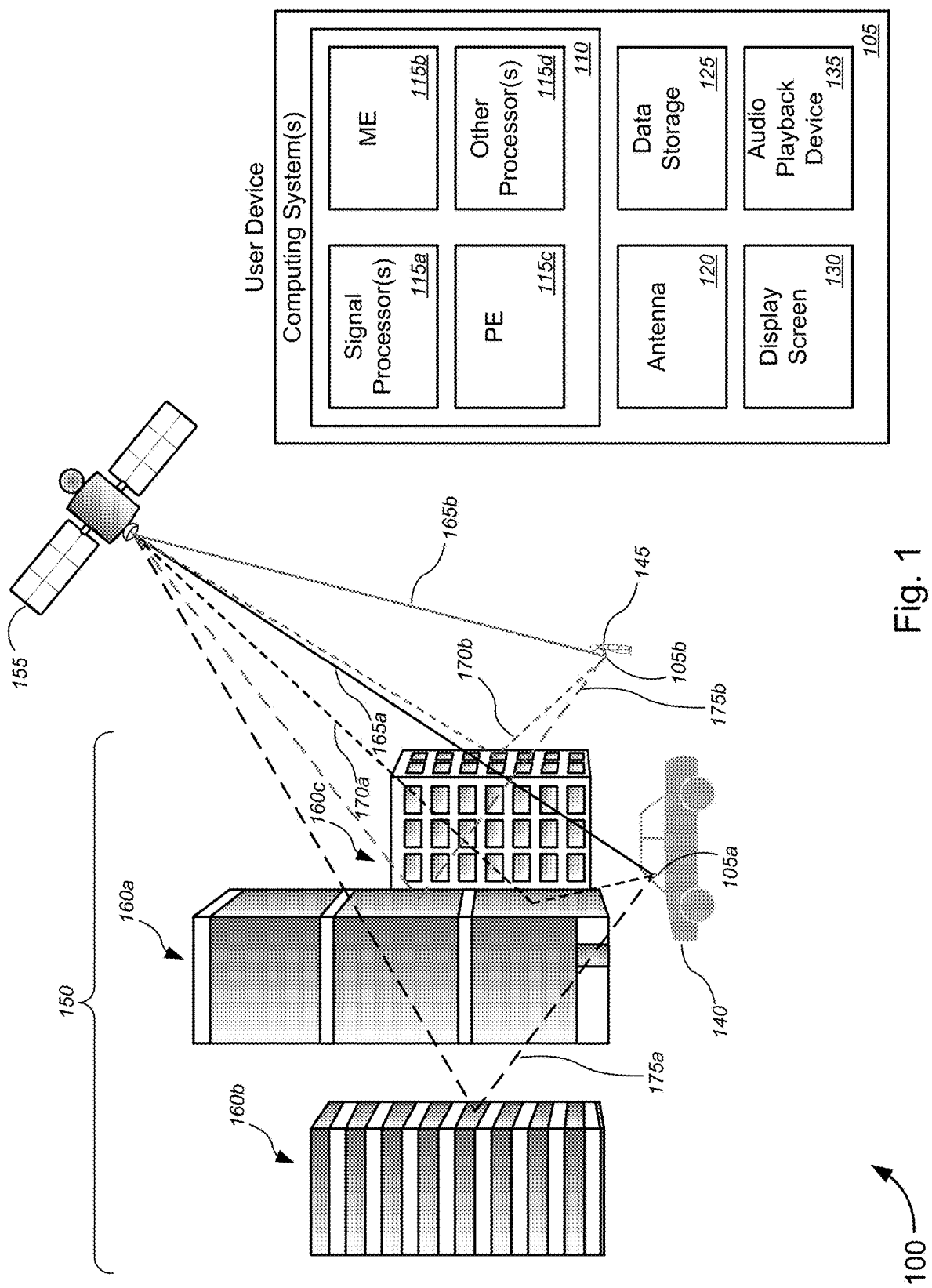
FIG. 1 is a schematic diagram illustrating a system for implementing detection and estimation of direct and reflected navigation satellite (e.g., global navigation satellite system ("GNSS"), etc.) signal parameters in a multipath environment, in accordance with various embodiments.

Various embodiments provide tools and techniques for implementing geographical location determination using navigation satellite, and, more particularly, to methods, systems, and apparatuses for implementing detection and estimation of direct and reflected navigation satellite (e.g., GNSS, etc.) signal parameters in a multipath environment.

In various embodiments, a computing system of a user device (e.g., satellite navigation device or user device with satellite navigation functionality, or the like) concurrently receives a plurality of signals from a first satellite, each of the plurality of signals travelling along a different path between the first satellite and the user device within a multipath ("MP") environment. The computing system analyzes the received plurality of signals to identify two or more signal peaks that fall within a tracking aperture spanning a first set of code delay values along a first dimension and a first set of frequency offset values along a second dimension, the identified two or more signal peaks corresponding to two or more signals, among the plurality of signals, whose relative code delay and relative frequency offset fall within the first set of code delay values and the first set of frequency offset values of the tracking aperture. The computing system concurrently measures signal parameters from at least one signal peak among the identified two or more signal peaks to determine one or more peak parameter estimates for each of the at least one signal peak; and provides the determined one or more peak parameter estimates for each of the at least one signal peak to a position engine ("PE") of the user device to calculate a navigation solution for the user device.

In the various aspects described herein, systems and methods for implementing detection and estimation of direct and reflected navigation satellite (e.g., GNSS, etc.) signal parameters in the multipath environment are provided. Multipath signals are a key source of error for satellite navigation (e.g., GNSS, etc.) receivers, and the various embodiments enable robust detection and estimation of signal parameters for line-of-sight ("LOS") signals and non-line-of-sight ("NLOS") signals. For example, each NLOS signal differs from the LOS signal in power, code delay, carrier phase, and frequency, etc. NLOS signals are typically (although not always) weaker than LOS signals due to reflected surfaces absorbing or dispersing RF power (e.g., NLOS signals may be obstructed (i.e., resulting in no signal) or attenuated (i.e., weaker; such as due to transmission through tree canopy, or the like)). NLOS signals are delayed in code phase relative to LOS signals due to the excess path traveled by NLOS signals. NLOS signal frequency differs from LOS signals due to the relative motion of the user or vehicle with respect to the MP reflective surfaces (e.g., MP Doppler effects, or the like). In stationary user dynamics, in which there is slow to no movement of the GNSS device, the Doppler frequency distinction of the multipath peaks is greatly diminished, thus restricting grid analysis to code phase dimension only (i.e., to a one dimensional vector along the code phase axis, or the like). Also in such cases, the multipath correlation vector can be distorted by near-in multipath effects and/or contain multiple distinct correlation peaks. Distinct peak visibility is dependent on signal chipping rate (e.g., correlation response base width) and the excess path length travelled by each MP signal as compared to the direct LOS signal path. In the presence of user dynamics, the multipath correlation peaks can also distinguish themselves in the frequency domain. Each multipath signal can be centered at distinct Doppler offsets, caused by the relative motion of the user with respect to the MP reflective surfaces. As user dynamics increase, the frequency distinction increases as well. The measurement engine ("ME") in a GNSS receiver or other satellite navigation receiver is responsible to provide the position engine ("PE") with unbiased LOS pseudorange, Doppler, and carrier phase measurements. In multipath environments, the ME can produce biased measurements (e.g., tracking biased NLOS MP signal instead of the LOS signal or reporting biased LOS measurements due to near-in MP effects (e.g., distorted correlation vector), etc.) to the PE, resulting in a poor navigation solution (which includes position, velocity, and time ("PVT") solution(s)). The various embodiments serve to make the measurement engine aware of multiple signals simultaneously by providing a grid of tracked measurements (compared with conventional approaches in which each tracking channel provides only a single set of measurements).

Multiple measurements enable the ME to recognize the existence of multipath and take corrective action, including, but not limited to, (i) choosing the earliest arriving signal (e.g., LOS or lowest residuals measurement) from the multiplicity of later arriving multipath signals (e.g., NLOS); (ii) flagging or inflating uncertainties of high chipping rate measurements that are suspected of MP effects, thereby allowing the navigation solution to appropriately weight the measurement according to their quality and MP effects; (iii) flagging or inflating uncertainties of low chipping rate measurements (where higher chipping rate bands can better distinguish multipath peaks, and by collecting measurements from both high and low chipping rate bands from the same satellite transmission, can use the high chipping rate observations of multiple peaks to help flag and inflate uncertainties of the low chipping rate measurements and to flag at least one low chipping rate band in terms of a level of multipath measurement bias based on the identified and inflated uncertainties of the at least one low chipping rate band); and/or the like. Herein, "high chipping rate" may refer to chipping rates of ~10 MHz (such as with L5 band signals, or the like), while "low chipping rate" may refer to chipping rates of ~1 MHz (such as with L1 band signals, or the like). With high chipping rate measurements, a higher resolution (e.g., down to about 30 m in terms of base width or geometric distances separating multipath biases, or the like) may be obtained compared with that of low chipping rate measurements (e.g., about 300 m).

Multiple measurements also enable the ME to provide robust signal acquisition and reacquisition (e.g., after signal blockage in tunnels, urban canopies, etc.). While the PE (in the case that optional enhancements like sensors are used, for example) can maintain a grid tracker or grid aperture of the GNSS receiver or other satellite navigation receiver at the most likely location of the LOS signal (referred to herein as "PE aiding"), such PE aiding degrades over time based on several unmodeled factors and starvation of navigation signals in challenging or obstructed environments. Once the receiver exits the blockage situation, the grid will obtain a view of all detected peaks surrounding the grid prompt point provided by the PE. The ME will then evaluate the available peaks and select the most likely LOS signal, and seed the tracking loop with the selected grid peak signal parameters. As shown and described below, the various embodiments provide robust signal acquisition and reacquisition that is superior to PE aiding alone (although may be used in conjunction with PE aiding).

These and other aspects of the system and method for detection and estimation of direct and reflected navigation satellite (e.g., GNSS, etc.) signal parameters in the multipath environment are described in greater detail with respect to the figures.

The following detailed description illustrates a few embodiments in further detail to enable one of skill in the art to practice such embodiments. The described examples are provided for illustrative purposes and are not intended to limit the scope of the invention.

In the following description, for the purposes of explanation, numerous details are set forth in order to provide a thorough understanding of the described embodiments. It will be apparent to one skilled in the art, however, that other embodiments of the present invention may be practiced without some of these details. In other instances, some structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments as described herein—while embodying (in some cases) software products, computer-performed methods, and/or computer systems—represent tangible, concrete improvements to existing technological areas, including, without limitation, satellite navigation technology, GNSS technology, measurement engine ("ME") technology, Multipath ("MP") environment-based LOS signal detection technology, and/or the like. In other aspects, some embodiments can improve the functioning of user equipment or systems themselves (e.g., satellite navigation systems, GNSS systems, measurement engine ("ME") systems, Multipath ("MP") environment-based LOS signal detection systems, etc.), for example, by identifying, using a computing system of a user device, two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the user device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture; determining, using the computing system, one or more peak parameter estimates for each of the at least one signal peak based on measurement of signal parameters from at least one signal peak among the identified two or more signal peaks; and providing, using the computing system, the determined one or more peak parameter estimates for each of the at least one signal peak to a position engine ("PE") of the user device that is configured to calculate a navigation solution for the user device based at least in part on the determined one or more peak parameter estimates; and/or the like.

In particular, to the extent any abstract concepts are present in the various embodiments, those concepts can be implemented as described herein by devices, software, systems, and methods that involve novel functionality (e.g., steps or operations), such as, making the measurement engine ("ME") aware of multiple signals simultaneously by providing a grid of tracked measurements (compared with conventional approaches in which each tracking channel provides only a single set of measurements), thus enabling the ME to recognize the existence of multipath and take corrective action, as well as to enable the ME to provide robust signal acquisition and reacquisition (e.g., after signal blockage in tunnels, urban canopies, etc.), and/or the like, to name a few examples, that extend beyond mere conventional computer processing operations. These functionalities can produce tangible results outside of the implementing computer system, including, merely by way of example, optimized and robust detection and estimation of signal parameters for LOS signals and NLOS signals in MP environments that result in more accurate navigation solution for the user devices (or satellite navigation devices), at least some of which may be observed or measured by users, satellite navigation service providers, and/or user device (or satellite navigation device) manufacturers.

Some Embodiments

We now turn to the embodiments as illustrated by the drawings. FIGS. 1-5 illustrate some of the features of the method, system, and apparatus for implementing geographical location determination using navigation satellite, and, more particularly, to methods, systems, and apparatuses for implementing detection and estimation of direct and reflected navigation satellite (e.g., global navigation satellite system ("GNSS"), etc.) signal parameters in a multipath environment, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing detection and estimation of direct and reflected navigation satellite (e.g., GNSS, etc.) signal parameters in a multipath environment, in accordance with various embodiments.

In the non-limiting embodiment of FIG. 1, system 100 comprises a user device 105, which includes one of a smart phone (e.g., smart phone 105*b*, or the like), a mobile phone, a smart watch, a wearable device, a tablet computer, a laptop computer, a dedicated portable satellite navigation device, a vehicle-based satellite navigation device (e.g., vehicle-based satellite navigation device 105*a*, or the like), or other satellite navigation device, and/or the like. In some embodiments, user device 105 includes, without limitation, computing system(s) 110, antenna 120, data storage device 125, display screen 130 (e.g., one or more touchscreen display devices and/or one or more non-touchscreen display devices, or the like), and audio playback device 135 (e.g., one or more speakers, or the like), and/or the like. In some embodiments, the computing system(s) 110 includes, without limitation, at least one of a multitap correlator ("MTC"), a grid processor ("GP"), a signal peak detector ("PD"), a peak parameter estimator ("PPE"), a measurement engine ("ME"), or other processor (including, but not limited to, graphics processor unit(s) ("GPU(s)"), central processing unit(s) ("CPU(s)"), digital signal processor(s) ("DSP(s)"), and/or the like), and/or the like. In some instances, computing system(s) 110 comprises signal processor(s) 115*a* (e.g., a MTC, a GP, a PD, a DSP, etc.), a ME 115*b*, a position engine ("PE") 115*c*, and/or other processor(s). In some cases, the MTC, the GP, the PD, the PPE, the ME, and the PE may each be embodied as either processor hardware or one or more hardware-based circuit components. Alternatively, the MTC, the GP, the PD, the PPE, the ME, and the PE may each be embodied as software executed on one or more of the GPU(s), the CPU(s), and/or the DSP, or the like, In some instances, the GPU(s), the CPU(s), and the DSP may each be embodied as processor hardware. In some embodiments, the measurement engine provides information (including, but not limited to, unbiased LOS pseudorange, Doppler, and carrier phase measurements, or peak parameter estimates, etc.) to a position engine (also known as a "positioning engine"), which uses the information provided from the measurement engine to calculate a navigation solution for the user device. In some instances, the navigation solution may include, but is not limited to, at least one of determined position, determined velocity, and/or determined time, or the like. According to some embodiments, a semiconductor package(s), which is disposed within the user device 105, includes logic that either embodies at least one of the the MTC, the GP, the PD, the PPE, the ME, the PE, the GPU(s), the CPU(s), and/or the DSP, or the like, or performs functions of the at least one of the the MTC, the GP, the PD, the PPE, the ME, the PE, the GPU(s), the CPU(s), and/or the DSP, or the like.

Although not shown, in some embodiments, user device 105 further includes other components for performing non-satellite navigation system tasks (e.g., one or more of other processors (including, but not limited to, GPU(s), CPU(s), DSP(s), and/or the like, for performing other user device tasks or computations, or the like), communications system components (such as communications system components for communicating using protocols including, but not limited to, at least one of Bluetooth™ communications protocol, WiFi communications protocol, or other 802.11 suite of communications protocols, ZigBee communications protocol, Z-wave communications protocol, or other 802.15.4 suite of communications protocols, cellular communications protocol (e.g., 3G, 4G, 4G LTE, 5G, etc.), or other suitable communications protocols, and/or the like), camera(s), other user input devices or interfaces (e.g., keyboards, keypads, number pads, microphone, mouse, etc.), and/or the like).

System 100 further comprises a vehicle 140 in which is disposed vehicle-based satellite navigation device 105*a* and/or a user or person 145 who is using a user device (e.g., smart phone 105*b*, or the like), both located within a multipath ("MP") environment 150 (e.g., a city center, other urban area, other semi-urban area, or any location with reflective objects or structures that reflect signals such as signals from satellites (e.g., satellite 155, or the like), etc.).

In the non-limiting example of FIG. 1, the MP environment 150 includes an urban area in which a plurality of buildings or structures 160a-160c are located. System 100 further comprises satellite 155.

Although FIG. 1 depicts one or a small number of particular devices, systems, components, or things (e.g., two user devices 105a and 105b, one vehicle 140, one person 145, one satellite 155, and three buildings or structures 160a-160c, etc.), this is merely for simplicity of illustration, and the various embodiments are capable of performing detection and estimation of direct and reflected navigation satellite (e.g., GNSS, etc.) signal parameters any suitable multipath environment (e.g., MP environment 150, or the like), where a plurality of these and other devices, systems, components, or things are involved, used, and/or interacted with, or the like.

In operation, according to some embodiments, computing system 110 and/or user device 105a, 105b, or 105 (collectively, "computing system") performs the method of implementing detection and estimation of direct and reflected navigation satellite (e.g., GNSS, etc.) signal parameters of direct line-of-sight ("LOS") signals and reflected non-line-of-sight ("NLOS") signals, respectively, in the multipath environment 150, as shown, and described below, with respect to FIGS. 2-4. For example, as shown in FIG. 1, LOS signals include LOS signal 165a (depicted in FIG. 1 as a black solid line) from satellite 155 to vehicle-based satellite navigation device 105a disposed in vehicle 140 and LOS signal 165b (depicted in FIG. 1 as a gray solid line) from satellite 155 to smart phone 105b used by, held by, or otherwise on user 145, or the like. Also shown in FIG. 1 are the NLOS signals, which include NLOS signal 170a (depicted in FIG. 1 as a black dashed line) and NLOS signal 175a (depicted in FIG. 1 as a black long-dashed line) from satellite 155 to vehicle-based satellite navigation device 105a and NLOS signal 170b (depicted in FIG. 1 as a gray dashed line) and NLOS signal 175b (depicted in FIG. 1 as a gray long-dashed line) from satellite 155 to smart phone 105b. The various embodiments also detects other signals (which may or may not be the LOS signals and/or NLOS signals) for identifying peaks within a tracking aperture. Herein, "tracking aperture" (also referred to as "aperture of the grid domain" or "energy grid" or the like) may refer to a two-dimensional window (such as the energy grid 240" as shown, e.g., in FIG. 3F, or the like), in which signal data is tracked in terms of frequency bins (along one dimension of the window) and code taps (along the other dimension of the window). By limiting the set of values for frequency bins and the set of values for code taps, one can "narrow" the window to focus on likely signals of interest (e.g., potential LOS signals, or the like). In some cases, a grid tracker of the GNSS receiver or other satellite navigation receiver may control the two dimensions of the tracking aperture to monitor or track signals from the satellite. In some instances, the grid tracker may be embodied by at least one of a multitap correlator (e.g., MTC 220 or 220' of FIG. 3A or 3E, or the like), tracker control (e.g., tracker control 310 of FIG. 3A or 3E, or the like), grid aperture control (e.g., grid aperture control 330 or 330' of FIG. 3 or 3E, or the like), or grid processor (e.g., GP 230 of FIG. 3B, or the like).

These and other functions of the system 100 (and its components) are described in greater detail below with respect to FIGS. 2-4.

Figure 2:
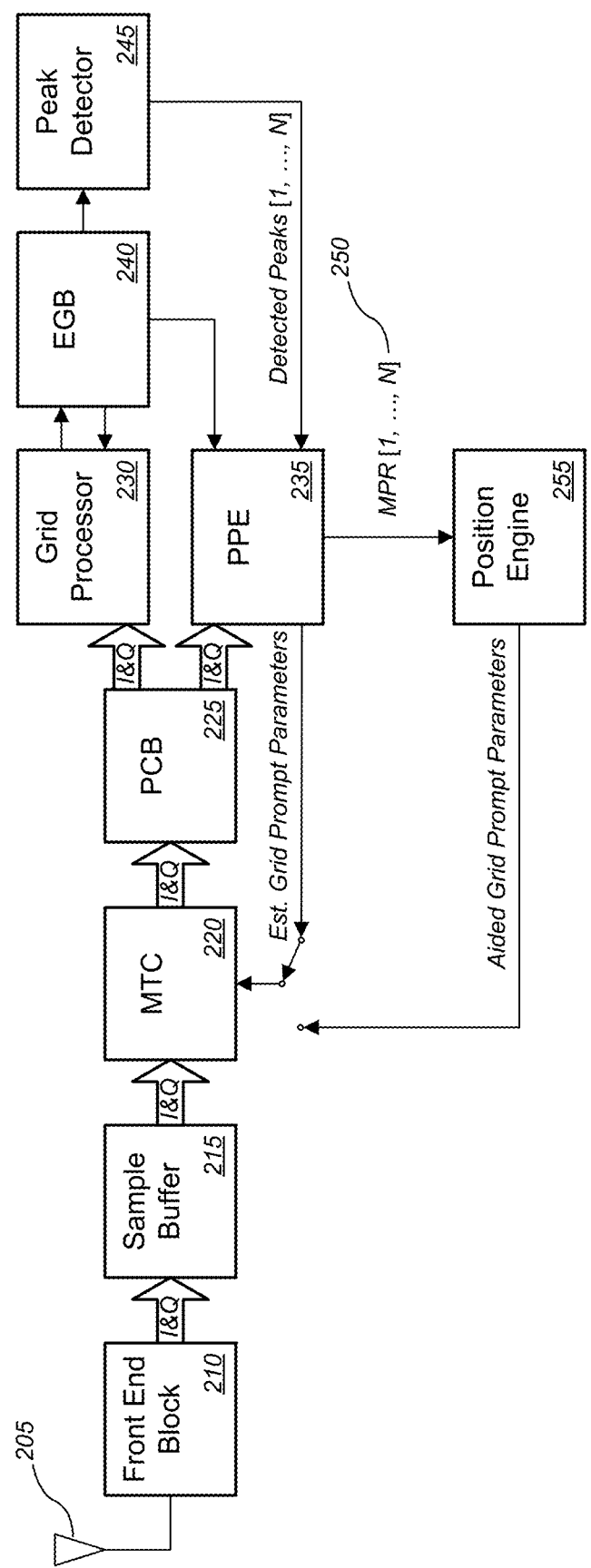
FIG. 2 is a schematic block flow diagram illustrating a non-limiting example of interactions amongst components of a satellite navigation device that may be used for implementing detection and estimation of direct and reflected navigation satellite (e.g., GNSS, etc.) signal parameters in the multipath environment, in accordance with various embodiments.

FIG. 2 is a schematic block flow diagram illustrating a non-limiting example 200 of interactions amongst components of a satellite navigation device that may be used for implementing detection and estimation of direct and reflected navigation satellite (e.g., GNSS, etc.) signal parameters in the multipath environment, in accordance with various embodiments.

With reference to the non-limiting embodiment 200 of FIG. 2, signal (e.g., GNSS signal, etc.) and its delayed multipath reflections arrive at the receiver antenna 205, and are filtered, frequency downconverted to an intermediate frequency ("IF"), and conditioned in the front end ("FE") block 210. The digital output of the FE block 210 (e.g., in-phase and quadrature ("I/Q") stream, or the like) is stored into sample buffer ("SB") 215. Sample buffer 215 is configured to collect real-time IF I/Q samples from the FE block 210, while servicing the multiple access, faster than real-time requirements of single and/or multiple instance multi-tap correlator ("MTC") 220. The MTC's signal processing services each tracked satellite or space vehicle ("SV") signal by frequency shifting (e.g., by removing IF and satellite Doppler shift associated with the given satellite, etc.) to baseband and convolving with a local copy of a pseudo-random code sequence associated with the satellite (e.g., satellite 155 of FIG. 1, or the like). The output of the MTC 220 is a time sequenced baseband I/Q stream for a programmable number of delay taps and tap spacing around a specified prompt tap and frequency. The prompt tap (also referred to as "central or prompt phase" or the like) and prompt frequency can either be estimated by peak parameter estimator ("PPE") 235, or by the code and frequency estimate derived by the position engine solution ("PE") 255. The PE estimate is typically used when the prompt signal and the reflected signals are absent due to signal blockage, or the PE internal algorithms have decided to override the currently tracked prompt location. In some embodiments, the MTC 220 may use as additional inputs of at least one of estimated grid prompt parameters from PPE 235 and/or aided grid prompt parameters from PE 255, in some cases, in a switched manner (such as shown, but not limited to, the arrows with switched inputs between PPE 235 or PE 255 and MTC 220).

A circular post correlation buffer ("PCB") 225 is the repository of the multitap, time sequenced baseband I/Q samples produced by MTC 220. Circular PCB 225 is configured to continue collecting I/Q samples from the incoming signal processing blocks (e.g., FE 210, SB 215, and MTC 220, etc.), while servicing the multiplicity of algorithms employed by the post signal processing blocks (e.g., grid processor ("GP") 230 and PPE 235, etc.). The post signal processing blocks employ a multitude of algorithms best suited to extract signal parameters for detected multipath signals under multitude of signal conditions. GP 230 produces a two-dimensional ("2D") energy grid (or energy value grid or array) that is coherently and non-coherently integrated over a programmable duration, a number of frequency bins, and a programmable bin spacing for all taps (or pseudo-random number ("PRN") code offsets) produced by MTC 220. Herein, "programmable duration" may refer to a duration that is predetermined (or set at a default duration) yet later adjustable by a user or the ME to refine or optimize the 2D energy grid. In some embodiments, the ME predetermines several programmable settings that can be switched and selected dynamically based on signal environment and device dynamic conditions. For example, for improved signal sensitivity in weak signal environments, the programmable duration may be set to longer integration settings. In contrast, for higher dynamic circumstances in strong signal environments, the programmable duration may be set to shorter integration settings. GP 230 may be a combination of hardware coprocessor and general purpose CPU to provide sophisticated and accelerated grid analysis capability. Energy grid buffer ("EGB") 240 is the repository of the 2D energy grid produced by GP 230, and is also re-read by the GP 230 to perform non-coherent energy grid accumulations over longer durations (as shown in FIG. 2 by the arrow from EGB 240 to GP 230). Furthermore, the accumulations are monitored by the GP 230 to flag signal detections by thresholding and to localize the positions of these detections, thereby minimizing the involvement by general purpose embedded CPU.

Peak detection and identification block or peak detector ("PD") 245 is responsible for identifying and localizing distinct multipath signals, and their associated early-late tap samples. PD 245 produces the following signal parameter estimates for each of the detected peaks in EGB 240: (1) Peak fit for refined code phase estimate; (2) Peak signal strength (e.g., CNo or $C/N_o$) estimate; and (3) Peak coarse frequency estimate via bin center or sync fit (e.g., by seeding open and/or closed loop frequency and phase estimate algorithms, etc.). The output of PD 245 is a detected peak list with the above-mentioned parameter estimates provided to PPE 235. PPE 235 uses the detected peak list and their associated fit estimates to identify the nearest code tap I/Q stream (e.g., row) in PCB 225 and applies GNSS open and closed loop algorithms to refine frequency, phase, and navigation data bit estimates. Some sample algorithms include, without limitation, phase lock loops ("PLL") (for refining frequency, phase, and data bits), frequency lock loops ("FLL") (for refining frequency and data bits), and/or open loop lag–1 complex cross products (for refining average frequency), and/or the like. At the end of a measurement interval ("MI"), the multi-peak estimates are collected and transmitted to the PE 255 for consumption by the navigation solution and its associated acquisition and multipath mitigation logic.

The following are some non-limiting associated areas of application that best suits the use of grids: (A) detecting the earliest peak; (B) estimating MP bias; and/or (C) tracking during signal outages; and/or the like.

Regarding (A), one area of benefit of grids is the detection of the earliest peak (i.e., signal with the shortest signal path). This typically will be the desired LOS signal, and in the cases when it is not, it will be the measurement with the least measurement bias. This is also helpful to the ME, which can find itself tracking non-LOS signals. This LOS detection would allow the ME to redirect its loops back onto the earliest signal as soon as the earlier signal appears.

Regarding (B), an extension of (A), another area of benefit of grids is to estimate the MP bias (i.e., excess path length) introduced by each non-LOS peak when the LOS signal is present. This can be considered the calibration and/or MP modeling phase of the MP bias estimation. For instance, if a short time later, the LOS signal is obstructed, and the non-LOS signals are still present, the PE can estimate a LOS equivalent pseudorange from the non-LOS pseudorange by using the MP bias correction estimated in an earlier calibration and/or MP modeling phase. This effectively allows the PE to navigate with pure non-LOS signals as if they were equivalent to the LOS signals. Herein, "pseudorange" may refer to an approximate distance (or pseudo distance) between the satellite and the satellite navigation device. "LOS equivalent pseudorange" or "LOS pseudorange" may refer to approximate distance measurements based on LOS signals, while "non-LOS pseudorange" may refer to approximate distance measurements based on NLOS signals, or the like.

Regarding (C), the grids are a natural technology to use during signal outages such as travelling in tunnels. The tracker (in some cases, with the assistance of the PE aiding and optionally sensors, etc.) can maintain the grid prompt at the most likely code and frequency location of the LOS signal (i.e., grid prompt). As long as the tracking loop uncertainty remains within the aperture of the grid domain, upon exiting the signal blockage event, the signal can be quickly detected and pulled-in to resolve the accumulated track error during the signal outage.

These and other functions of the example(s) 200 (and its components) are described in greater detail herein with respect to FIGS. 1, 3, and 4.

FIGS. 3A-3G (collectively, "FIG. 3") are schematic diagrams illustrating various non-limiting examples 300 and/or 300' of interactions amongst the components of FIG. 2 during implementation of detection and estimation of direct and reflected navigation satellite (e.g., GNSS, etc.) signal parameters in the multipath environment, in accordance with various embodiments.

Figure 3A:
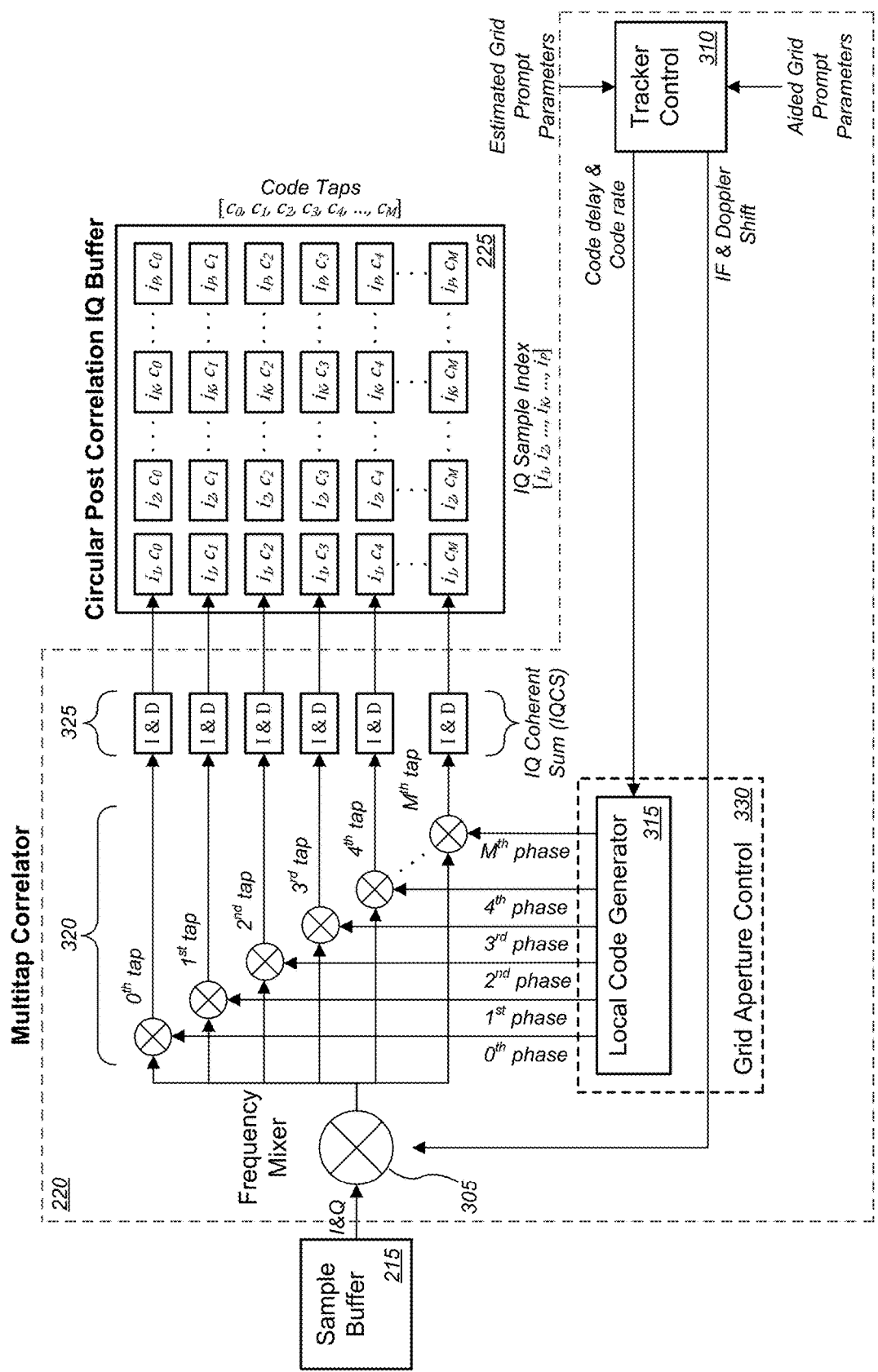
FIGS. 3A-3G are schematic diagrams illustrating various non-limiting examples of interactions amongst the components of FIG. 2 during implementation of detection and estimation of direct and reflected navigation satellite (e.g., GNSS, etc.) signal parameters in the multipath environment, in accordance with various embodiments.

As shown in the non-limiting example 300 of FIG. 3A, multitap correlator ("MTC") 220 reads out samples from sample buffer ("SB") 215 to remove IF and satellite Doppler shift in the frequency mixer 305, and produces convolutions of the input signal with M PRN code replicas 320 of a particular satellite (e.g., satellite 155 of FIG. 1, or the like). Each replica 320 produced by local code generator 315 (which may be part of a grid aperture control 330) has a predetermined code phase shift with respect to the central (or prompt) phase calculated by tracker control block 310. As a result, M sample streams are produced by MTC 220, where each stream corresponds to the particular PRN code delay. These sample streams then separately come to Integrate and Dump ("I&D") blocks 325, where signals are coherently accumulated up to a predetermined integration ("PDI") time as an IQ Coherent Sum ("IQCS") and are then dumped to Circular Post Correlation IQ Buffer ("PCB") 225. As a result, PCB 225 contains a two-dimensional array of in-phase and quadrature ("I/Q") samples for a particular satellite, with a first dimension being a PRN code offset (herein referred to as "tap" or "code tap") and a second dimension being a post correlation sample index (or time). The MTC 220 can read out the same samples from SB 215 multiple times for each satellite. The size of SB 215 is chosen, designed, and/or configured to be sufficient to avoid circular overwrites before all required satellites are processed. Similarly, a grid processor ("GP") block 230 can read out the same samples from PCB 225 multiple times to produce grid energy. The size of PCB 225 is likewise chosen, designed, and/or configured to be sufficient to avoid circular overwrites before grid energy is produced.

Figure 3B:
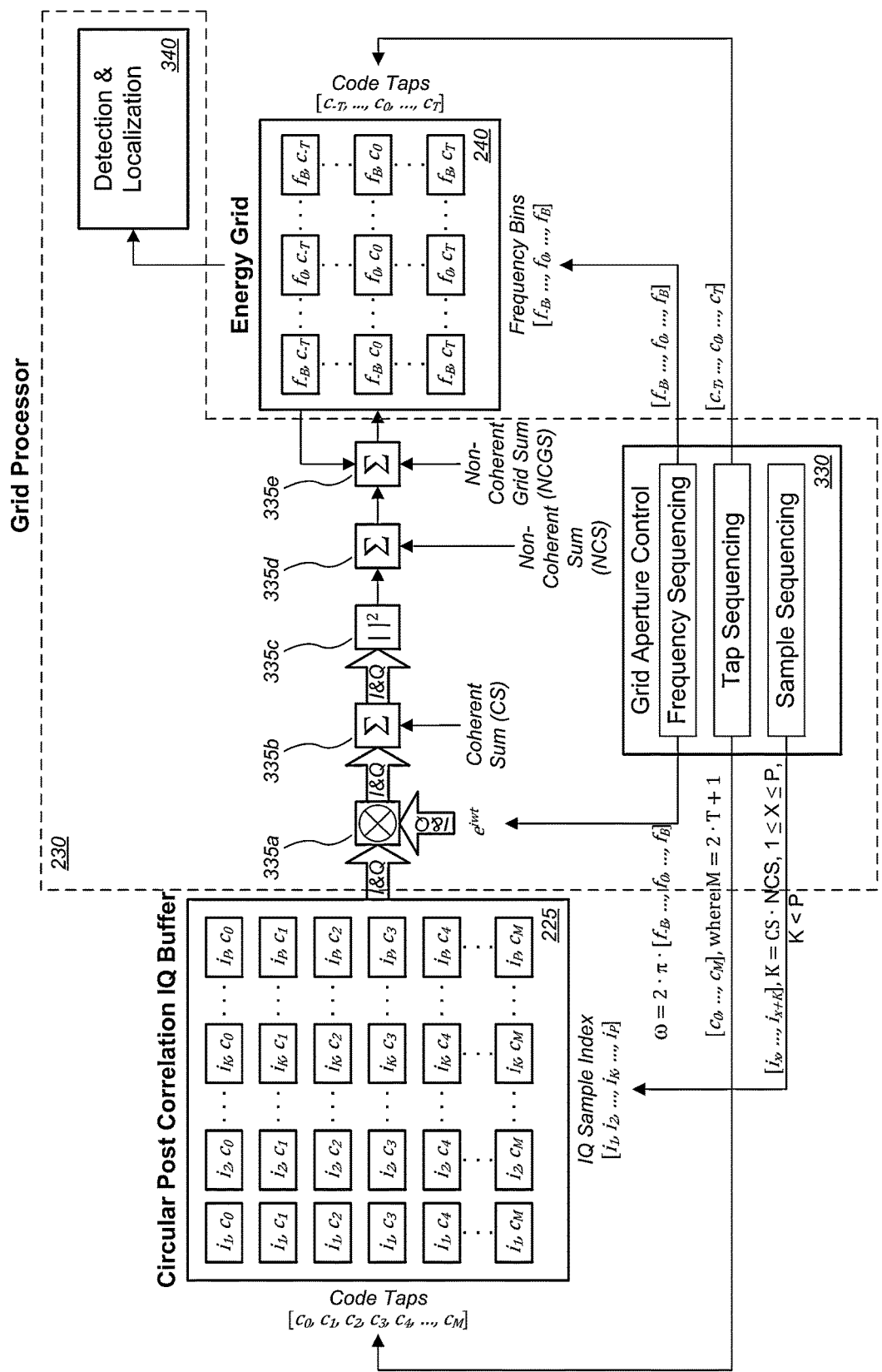

As shown in the non-limiting example 300 of FIG. 3B, the next block following the PCB 225 is GP 230. PCB 225 contains the multitap I/Q samples from a particular satellite (e.g., satellite 155 of FIG. 1, or the like). Once PCB 225 has collected N continuous I/Q samples (where N is less than or equal to the total number P of I/Q samples that PCB 225 can store), the GP block 230 is kick-started. GP 230 has a three level iteration loop managed by grid aperture control block ("GAC") 330. The outermost loop selects the I/Q stream tap offset to push through GP 230. The next level loop selects the bin frequency to apply to the selected I/Q stream. The innermost loop enumerates through all the I/Q samples for the selected tap offset. The output at the end of the innermost loop is a current scalar grid energy at the corresponding code tap and frequency bin.

The grid energy is formed by the following signal processing sequence. The I/Q samples from PCB 225 are frequency shifted to the selected bin frequency using the complex mixer ("CM") 335*a*. The output of the CM 335*a* is then coherently accumulated by coherent accumulator ("COH") 335*b* for a programmable, selectable, or predetermined coherent duration that is set by a parameter referred to as coherent sum ("CS"). The magnitude squared of the accumulated I/Q vector is determined by sample power block ("PWR") 335*c*. This sample power is further accumulated by non-coherent accumulator ("NCOH") 335*d* for a programmable, selectable, or predetermined non-coherent duration that is set by a parameter referred to as non-coherent sum ("NCS"). The output of the NCOH 335*d* is the current grid sample based on the PCB I/Q buffer sample. If the parameter referred to as non-coherent grid sum ("NCGS") is set to a value of "0," then grid accumulator 335*e* overwrites EGB 240 with the current grid sample that is output from NCOH 335*d*. If NCGS is a non-zero (positive) value, then grid accumulator 335*e* adds the corresponding iteration energy grid power value in EGB 240 with the current grid sample that is output from NCOH 335*d*, and stores the resultant (scalar) value in the EGB 240 replacing said corresponding iteration energy grid power value that was added. The NCGS also serves as a counter for indicating the number of times that such operations are performed (i.e., counting the number of current grid samples to add). At the end of every GP run, detect and localization block ("DL") 340 will contain a bit mask identifying the location in the EGB 240 where the grid energy has exceeded a specified energy threshold. This mask is used by subsequent analysis blocks to localize the areas where further analysis is required, and reduces the workload on the general purpose CPU. Herein, "coherent sum" refers to independently summing I and Q values, while "non-coherent sum" refers to summing scalar power values (e.g., $I^2+Q^2$). Herein also, each GP run may be defined as a current grid block that spans, e.g., all values between $i_1$ and $i_K$ within the PCB 225, with subsequent grid block spanning between $i_{K+1}$ and $i_{2K}$, and so on.

Figure 3C:
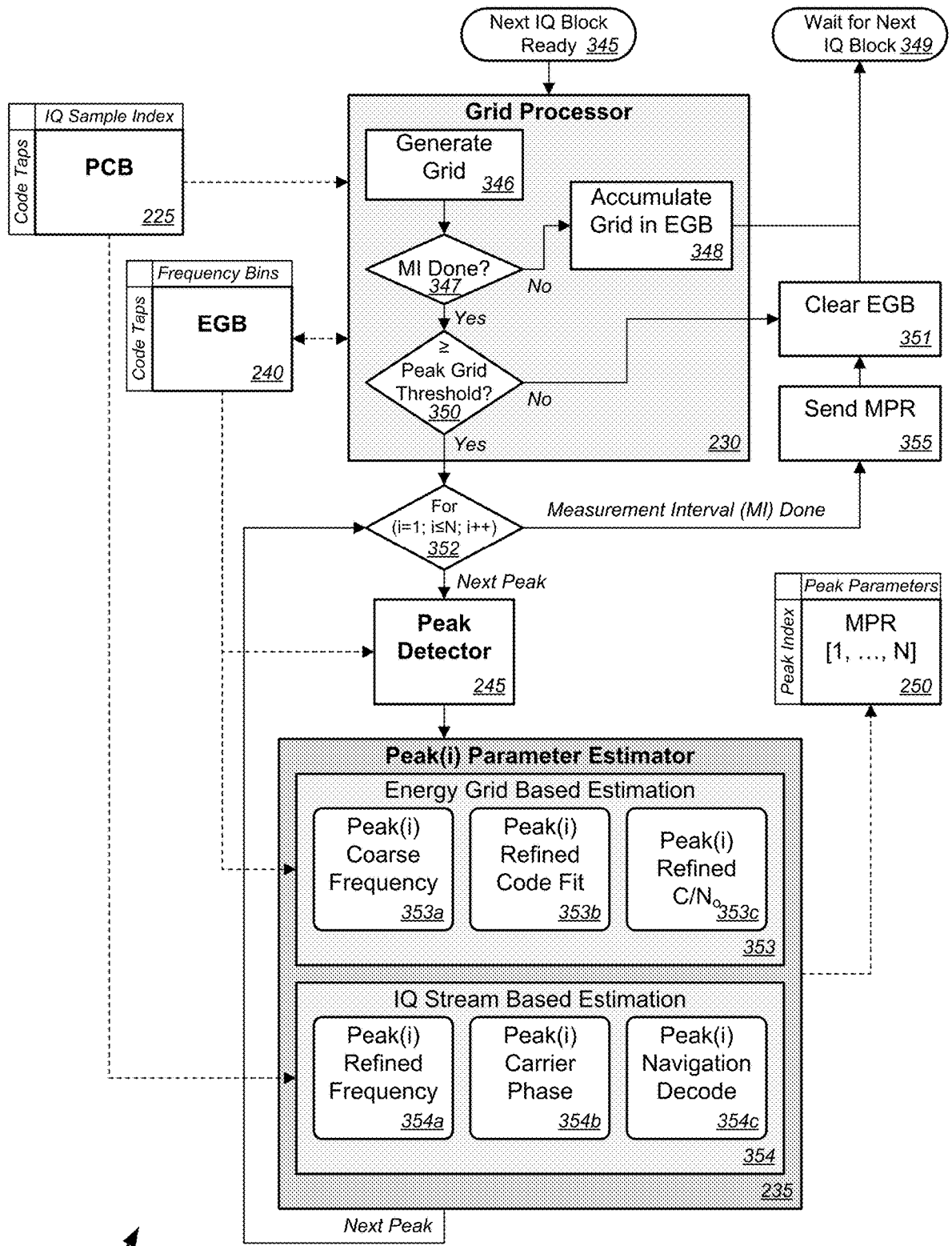

A high level software flowchart of the multi-peak detection, identification, and parameter estimation engine is shown in the non-limiting example 300 of FIG. 3C. The input to this flowchart is the incoming data from PCB 225 and EGB 240 produced by the previous processing blocks (that is, MTC 220 and GP 230). The flowchart in FIG. 3C is one possible configuration of the software algorithms and framework, and it can be configured differently as the need or circumstances require. Regardless of the software configuration, the framework must produce the multi-peak measurement report at the end of every measurement interval ("MI"). The MI can be partitioned into smaller distinct block intervals that accommodate the constraints of the hardware pipeline buffer design as discussed earlier. Ultimately, the MI report period can be as short as a block or can be an aggregate of multiple blocks. The variability of the MI period allows for greater flexibility, allowing for different position, velocity, and time ("PVT") requirements, signal environments, and signal processing performance goals.

Referring back to FIG. 3C, MTC 220 kickstarts GP 230 when PCB 225 has been filled with a block of N I/Q samples. GP 230 can be configured to hardware accumulate the grid blocks until the prescribed measurement report interval (e.g., MI) (processes 345-349), at which point the multi-peak report ("MPR") 250 is sent (process 355). In each block interval, the intermediate results are monitored by the hardware of GP 230 for energy that has exceeded a programmable threshold level (processes 350, 351, 349). In addition, GP 230 can communicate the grid locations (e.g., row, column, etc.) of all the threshold detections via a detection mask field. The detection results are pushed to the peak detection block or peak detector ("PD") 245 every MI or optionally every block (processes 352). PD 245 uses the grid threshold detections and localization results to identify grid peaks, and their associated early-late correlation samples. Each unique peak is then presented to the peak parameter estimator ("PPE") 235, which comprises two stages, as also shown in FIG. 3D.

Figure 3D:
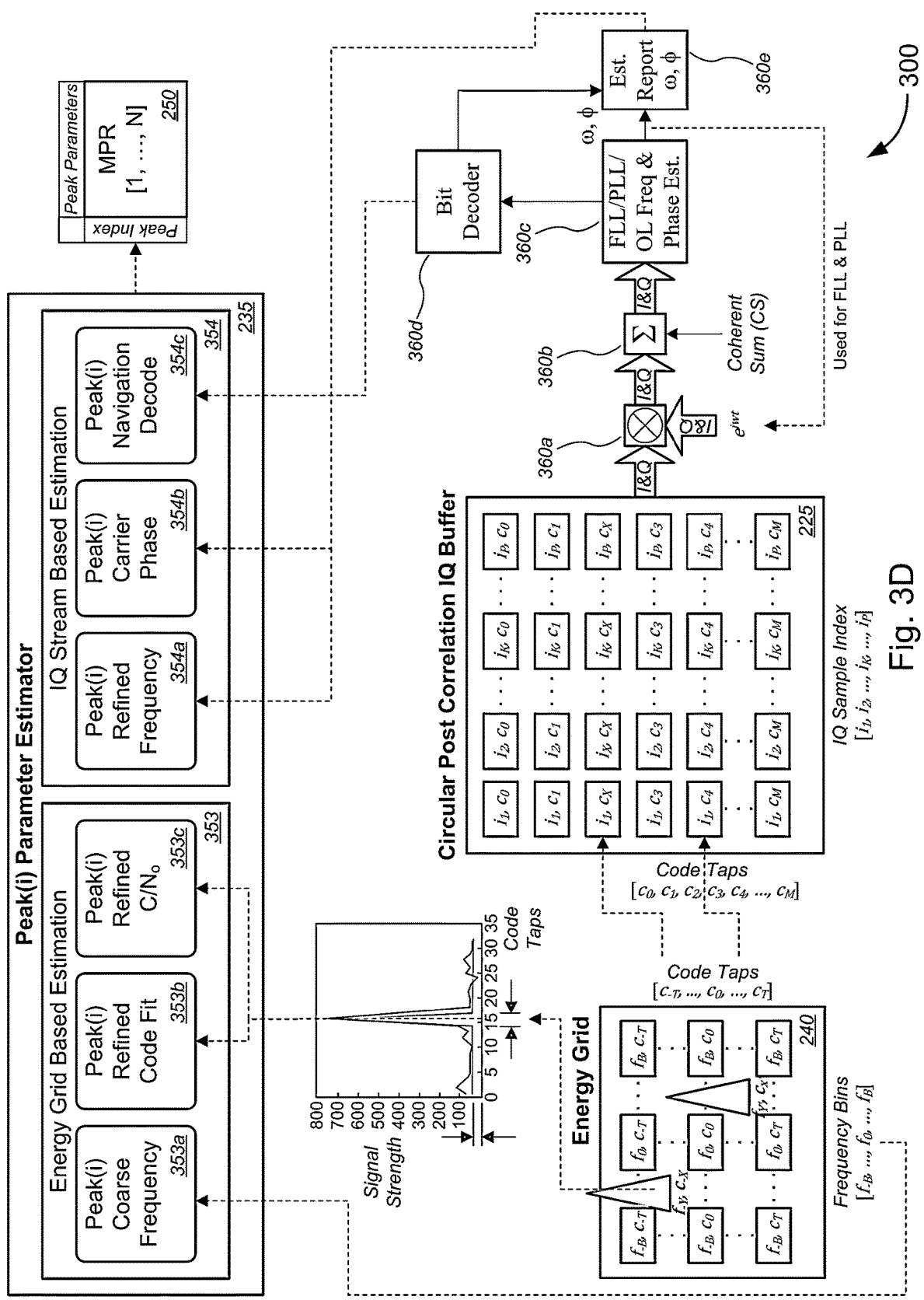

FIG. 3D depicts a non-limiting visualization of the two stages used by PPE 235. The first stage of PPE 235 uses the energy grid based algorithms (process 353). These algorithms use EGB 240 to estimate the peak's coarse frequency (e.g., bin frequency or sync fit) (process 353*a*), code phase (e.g., peak fit, peak refined code fit, or delay lock loop ("DLL")) (process 353*b*), and signal strength (e.g., CNo or $C/N_o$ via estimate of peak power and noise floor) (process 353*c*), or the like. The peak detections and parameter estimations of this first stage are stored into MPR buffer 250 (as shown in FIGS. 3C and 3D). The next stage of PPE 235, which is optional, uses the I/Q stream based algorithms (process 354) to further refine the peak parameter estimates found in MPR 250. This second stage iterates through each peak in MPR 250 and locates the code tap row in PCB 225 that most closely matches the peak's prompt code phase. The identified I/Q samples are then pushed through a multiplicity of refinement algorithms that can extract improved estimates of the peak's frequency and phase (e.g., via estimate report 360*e*, or the like) (processes 354*a* and 354*b*) and navigation data bits (e.g., via bit decoder 360*d*, or the like) (process 354*c*). The second stage refined estimates are then stored into MPR 250 along with or instead of the estimates from the first stage. In addition, for each peak, MPR 250 can also hold the most recent list of algorithms employed, their settings, and last known state, allowing for this information to be used in seeding in the next block's algorithms for the same peak. The refinement algorithms can be open or closed looped signal processing blocks similar to the one depicted in FIG. 3D. For closed loop signal processing, complex mixer ("CM") 360*a* can be used for frequency shifting the identified I/Q samples output from PCB 225 based on frequency (from FLL) or phase (from PLL) that is output from a FLL frequency discriminator, a PLL phase discriminator, and/or a lag-one open loop cross product discriminator (that is, for lag-one open loop, no feedback loop is required) block 360*c* (collectively, "FLL/PLL/OL frequency and phase estimator 360*c*" or "FLL/PLL/OL frequency and phase estimator block 360*c*" or the like). In some cases, for the FLL/PLL/OL frequency and phase estimator 360*c*, the loop sensitivity (e.g., via coherent accumulator ("COH") or coherent sum ("CS") 360*b*, or the like) and loop bandwidth can be programmatically adjusted to accommodate differing or evolving signal conditions and user and clock dynamics.

Figure 3E:
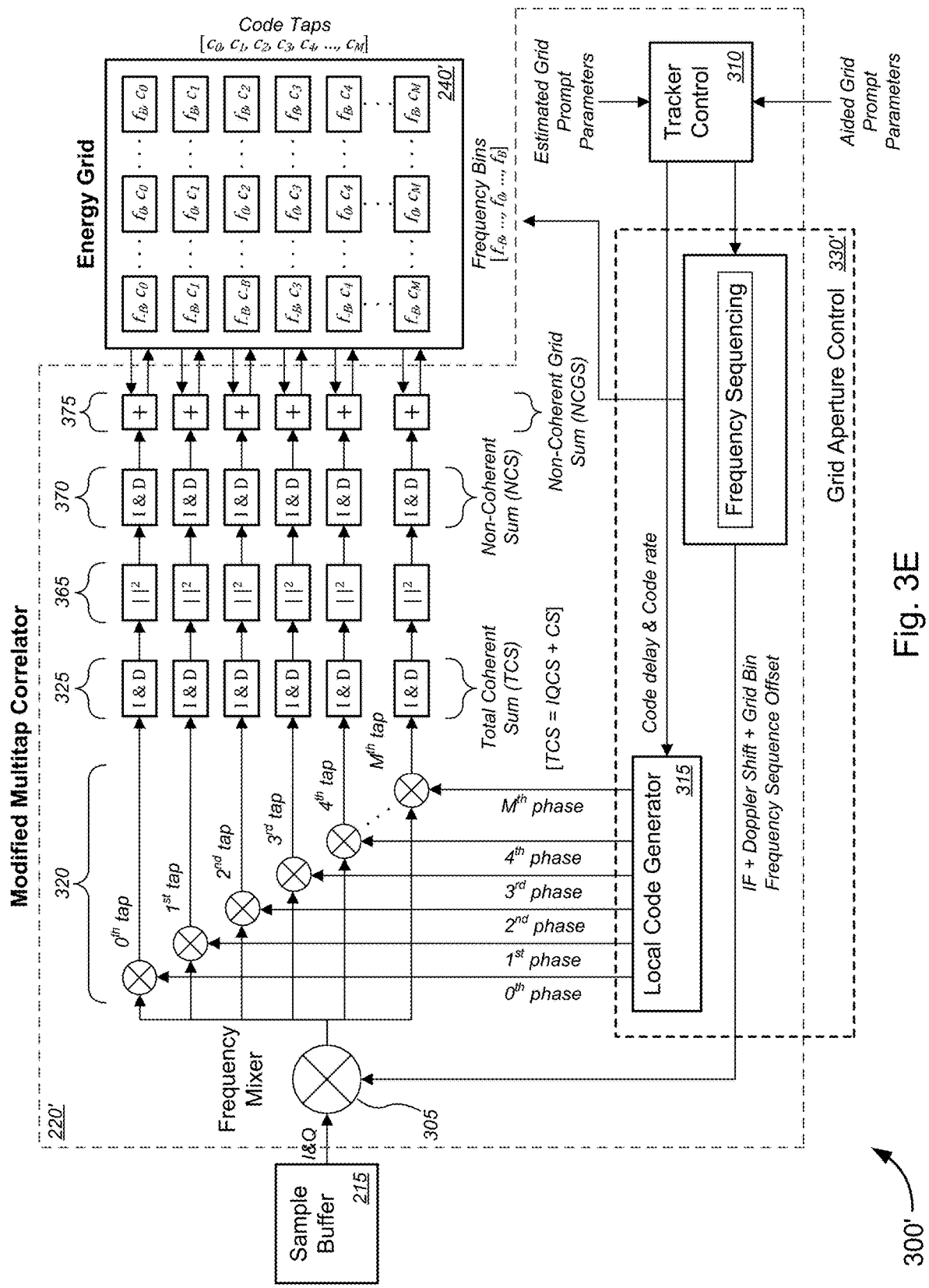

A modified multitap correlator ("MTCv2") 220' as depicted in FIG. 3E can serve as an alternative to MTC 220 as shown, and described, with respect to FIG. 3A. As shown in the non-limiting embodiment 300' of FIG. 3E, energy grid values can now be produced directly by the MTCv2 220', which does not require intermediate I/Q storage or I/Q post-processing compared with MTC 220 of FIG. 3A. Furthermore, the grid bin frequencies are mixed at the higher sample buffer ("SB") rate (e.g., 1 ms, or greater) allowing for wider grid frequency range and improved signal sensitivity at frequency range edges due to slower 1 ms Sync response roll-off. In addition, the grid bin frequencies are now sequenced and generated by grid aperture control block 330' of MTCv2 220'. Similar to the processes described above with respect to FIG. 3A, M sample streams that are produced by MTCv2 220' (corresponding to the particular PRN code delay) then separately come to Integrate and Dump ("I&D") blocks 325, where signals are coherently accumulated up to a predetermined integration ("PDI") time as (in this case) total coherent sum ("TCS") (where TCS (FIG. 3E)=MTC IQCS (FIG. 3A)+GP CS (FIG. 3B)), and, in this case, are then dumped to sample power blocks ("PWR") 365, which determine the magnitude squared of the accumulated I/Q vector. This sample power for the M sample streams then separately come to I&D blocks 370 as non-coherent sum ("NCS") (similar to GP NCS (FIG. 3B), where signals are non-coherently accumulated up to another PDI time, and, in this case, are then dumped to summer blocks 375 as non-coherent grid sum ("NCGS") (similar to GP NCGS (FIG. 3B), which integrates existing energy grid with current MTC energy results. Further, the energy grid results are still stored in the same output or similar EGB buffer (e.g., EGB 240' of FIG. 3E, or the like). The output from EGB 240' will now feed into a modified high level software flowchart of the multi-peak detection, identification, and parameter estimation engine. Since the I/Q streams are not present, only the first stage, grid energy based algorithms, will be used. The second stage, I/Q stream based algorithms refinements will be skipped. Although increased MTC cycles are required to generate the energy grid output and only energy grid-based algorithms (e.g., code, CNo, and coarse frequency, or the like) can be employed (with no refined frequency, carrier phase, or bit decoding estimates), MTCv2 220' enables significant hardware memory savings (e.g., no I/Q buffer storage), simplified I/Q post-processing hardware, and simultaneous tracking and estimation of multiple peaks with a single tracker, and/or the like. For the simplified I/Q post-processing hardware, although the DL 340 (FIG. 3B) is used, the EGB results are pushed through the backend process of the GP such that DL 340 will contain a bit mask identifying the location in the EGB 240 where the grid energy has exceeded a specified energy threshold. This mask is used by subsequent analysis blocks to localize the areas where further analysis is required, and reduces the workload on the general purpose CPU. In some cases, using higher sampling rate IQ streams to generate the grid frequency bins allows for wider grid frequency range and improved signal sensitivity at frequency range edges (e.g., ideal for signal reacquisition performance).

Figure 3F:
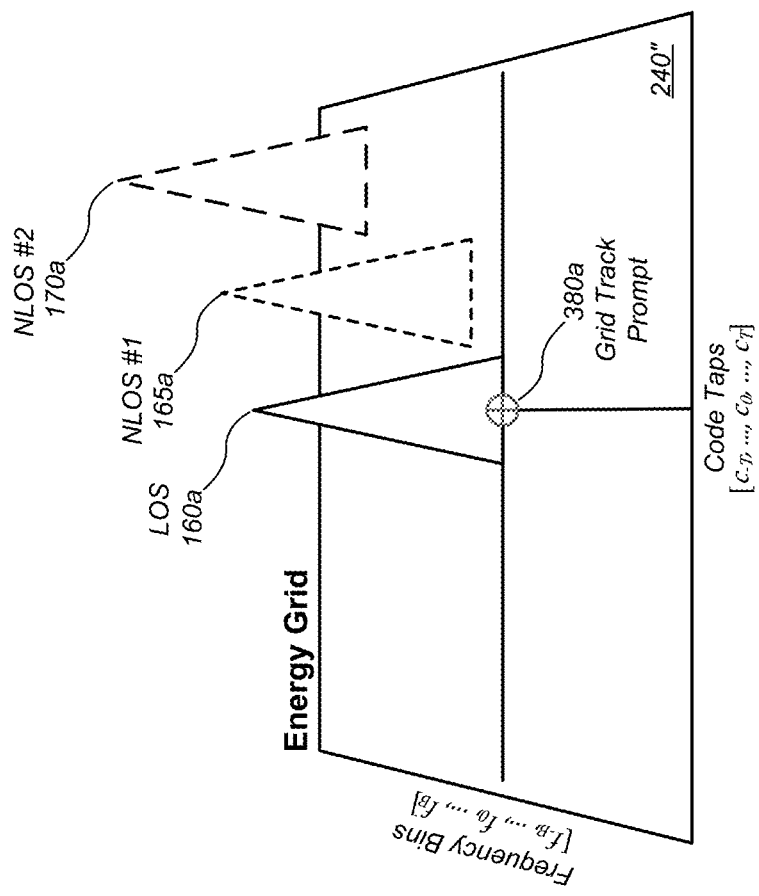

With reference to FIGS. 1 and 3F, the visualization of EGB 240" in FIG. 3F illustrates a conceptualization of how real-world multipath signals map onto the EGB 240" and how they can relate to the LOS (e.g., LOS 160a, or the like) signal and grid track point (e.g., grid track prompt 380a, or the like). Herein, EGB 240" corresponds to one or both of EGB 240 of FIG. 3B and/or EGB 240" of FIG. 3E, or the like. As depicted in FIG. 3F, the earliest peak typically is the LOS signal or the signal with the least multipath bias. When the LOS (e.g., LOS 160a, or the like) signal and MP (e.g., NLOS 165a and 170a, or the like) signals are both present in the navigation satellite solution (e.g., GNSS solution), the system can measure, learn, and predict the relative MP bias of non-LOS peaks, so that if a short time later the LOS is blocked, the non-LOS signals could be bias corrected to act like pseudo LOS signals. In addition, EGB 240" also captures the Doppler offsets on the MP signals due to the relative user motion with respect to SV and the MP reflective surfaces. The output of EGB 240" is used as input to peak detection and identification block ("PD") 245. In this non-limiting example, LOS 160a, NLOS #1 165a, and NLOS #2 170a of FIG. 3F correspond to LOS 160a, NLOS #1 165a, and NLOS #2 170a of FIG. 1. As further shown in FIG. 3F, grid track point or prompt 380a corresponds to LOS 160a.

Figure 3G:
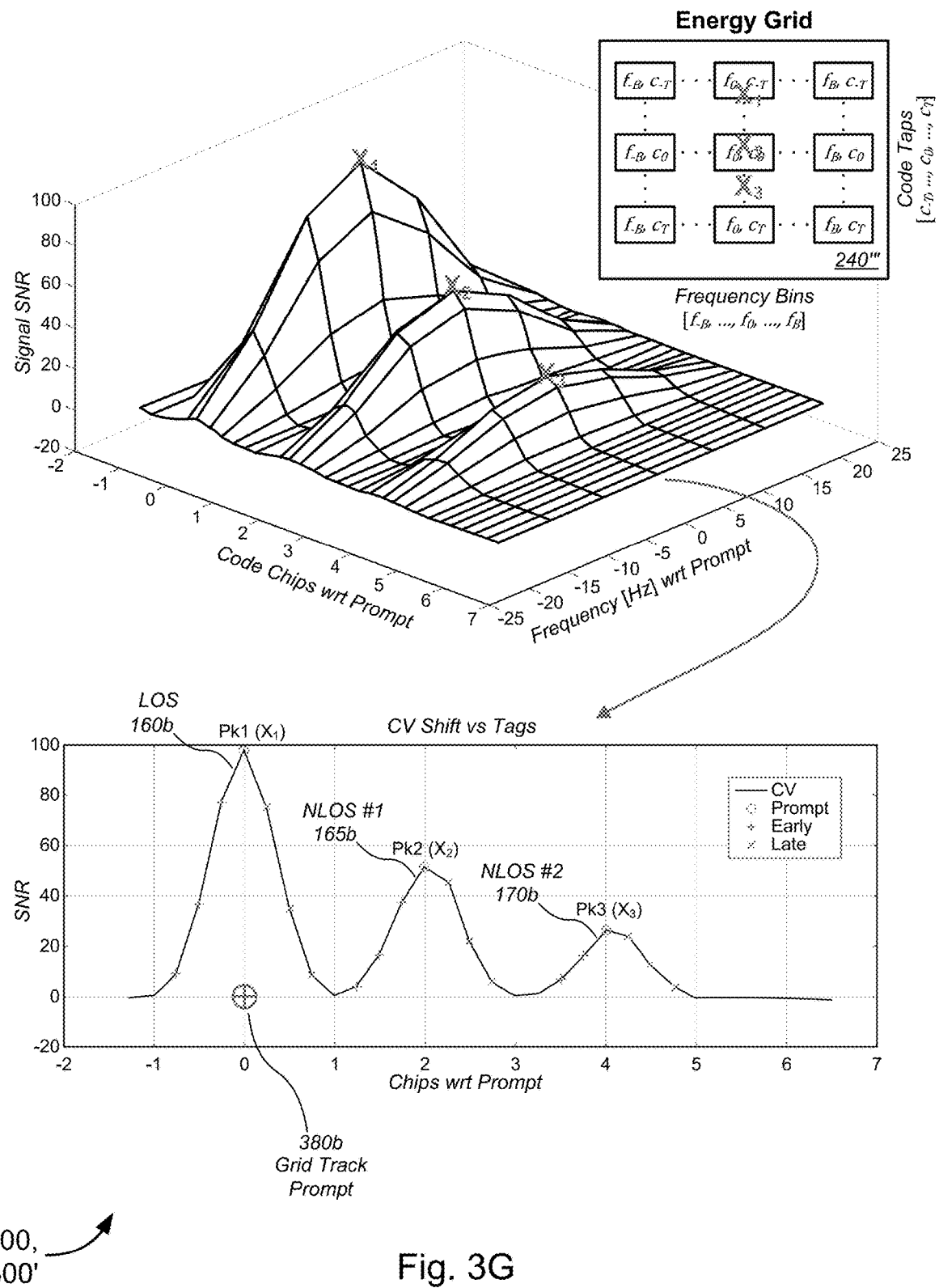

Referring to FIGS. 1 and 3G, the three-dimensional ("3D") contour plot of signal SNR to code chips (with respect to prompt) and frequency (with respect to prompt) and the 2D plot of SNR to code chips (with respect to prompt) depict a real-world collection using navigation satellite hardware for a pedestrian walk scenario. As depicted in FIG. 3G, the frequency dimension is less meaningful in this scenario due to low user movement speed, so the 2D EGB 240''' can be simplified to a one-dimensional ("1D") extra wide correlation vector, by taking a slice along all taps at the zero frequency bin. The distinct multipath peaks and the associated early-late samples (with early samples denoted by "+" symbol and the late samples denoted by "×" symbol in the 1D plot of SNR to code chips) can now be clearly seen and their relative peak positions (with prompt denoted by "⊕" symbol in the 1D plot of SNR to code chips) in the EGB 240''' structure as highlighted. Herein, EGB 240''' corresponds to one or both of EGB 240 of FIG. 3B and/or EGB 240" of FIG. 3E, or the like. The output of EGB 240''' is used as input to peak detection and identification block ("PD") 245. In this non-limiting example, LOS 160b, NLOS #1 165b, and NLOS #2 170b of FIG. 3G correspond to LOS 160b, NLOS #1 165b, and NLOS #2 170b of FIG. 1. As further shown in FIG. 3G, grid track point or prompt 380b corresponds to LOS 160b.

These and other functions of the examples 300 and 300' (and their components) are described in greater detail herein with respect to FIGS. 1, 2, and 4.

FIGS. 4A-4J (collectively, "FIG. 4") are flow diagrams illustrating a method 400 for implementing detection and estimation of direct and reflected navigation satellite (e.g., GNSS, etc.) signal parameters in the multipath environment, in accordance with various embodiments. Method 400 of one or more of FIGS. 4A, 4B, 4E, 4F, 4G, 4H, 4I, and/or 4J each continues onto FIG. 4C following the circular marker denoted, "A." Method 400 of one or more of FIGS. 4A and/or 4J each continues onto FIG. 4I following the circular marker denoted, "B." Method 400 of FIG. 4I returns to FIG. 4A or FIG. 4J following the circular marker denoted, "C." Method 400 of FIG. 4C continues onto FIG. 4D following the circular marker denoted, "D." Method 400 of FIG. 4D or FIG. 4H returns to FIG. 4A or FIG. 4J following the circular marker denoted, "E." Method 400 of FIG. 4D either continues onto FIG. 4E following the circular marker denoted, "F," continues onto FIG. 4F following the circular marker denoted, "G," or continues onto FIG. 4G following the circular marker denoted, "H." Method 400 of one or more of FIGS. 4A and/or 4J each continues onto FIG. 4H following the circular marker denoted, "I."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', and 300 or 300' of FIGS. 1, 2, 3A-3D, 3E, and 3F-3G, respectively (or components thereof), such methods may also be implemented using any suitable hardware (or software) implementation. Similarly, while each of the systems, examples, or embodiments 100, 200, 300, 300', and 300 or 300' of FIGS. 1, 2, 3A-3D, 3E, and 3F-3G, respectively (or components thereof), can operate according to the method 400 illustrated by FIG. 4 (e.g., by executing instructions embodied on a computer readable medium), the systems, examples, or embodiments 100, 200, 300, 300', and 300 or 300' of FIGS. 1, 2, 3A-3D, 3E, and 3F-3G can each also operate according to other modes of operation and/or perform other suitable procedures.

Figure 4A:
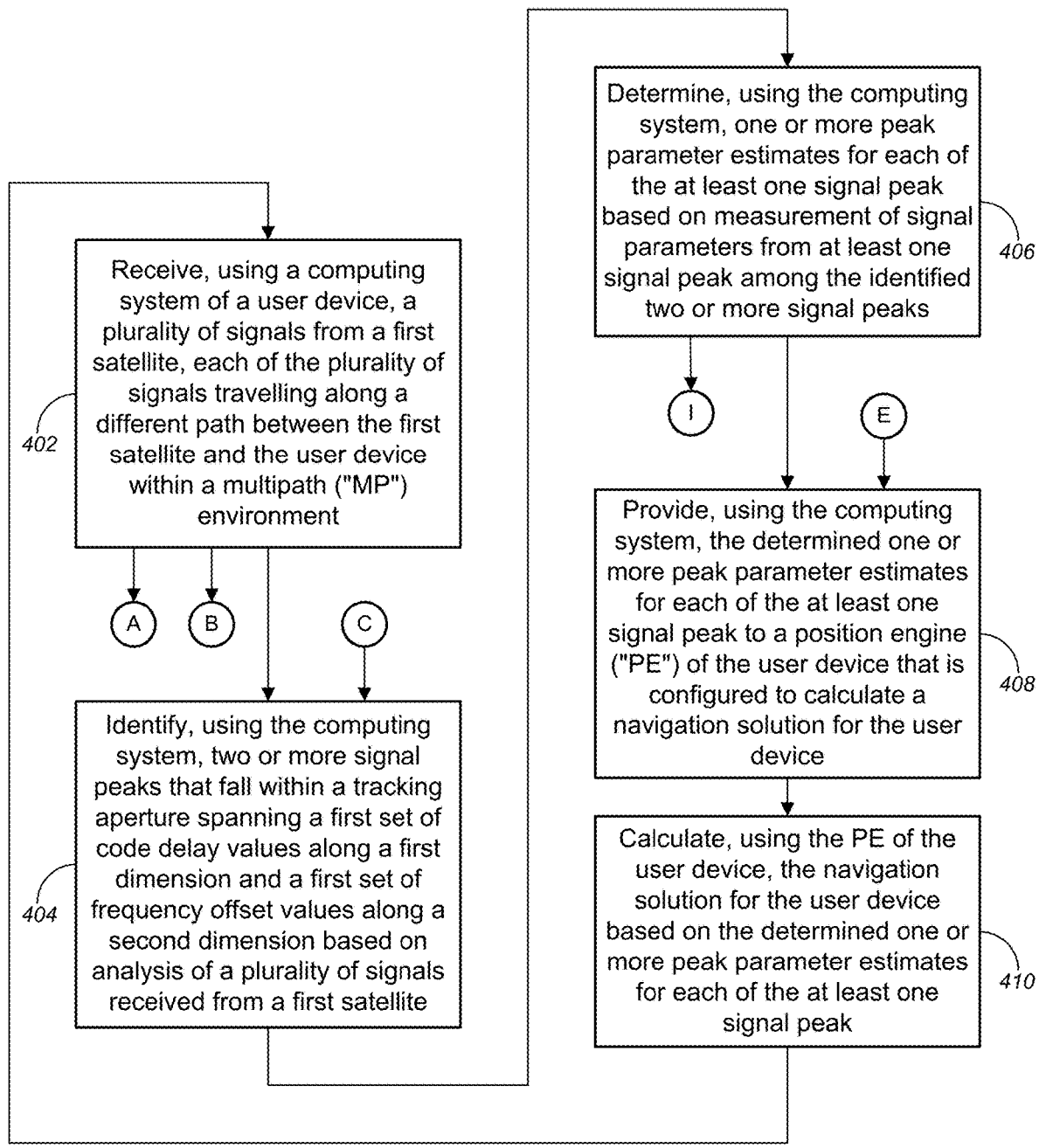

In the non-limiting embodiment of FIG. 4A, method 400, at block 402, comprises receiving, using a computing system of a user device, a plurality of signals from a first satellite, each of the plurality of signals travelling along a different path between the first satellite and the user device within a multipath ("MP") environment. In some cases, receiving the plurality of signals from the first satellite may be performed concurrently, sequentially, continuously, and/or over time. In some instances, receiving the plurality of signals may comprise (i) receiving the plurality of signals directly from the first satellite or (ii) receiving the plurality of signals from a sample buffer (such as described below with respect to FIG. 4B, or the like).

In some embodiments, the computing system includes, without limitation, at least one of a multitap correlator ("MTC"), a grid processor ("GP"), a signal peak detector ("PD"), a peak parameter estimator ("PPE"), a measurement engine ("ME"), a digital signal processor ("DSP"), or other processor, and/or the like (as described above with respect to FIGS. 1-3, or the like). In some instances, the user device includes, but is not limited to, one of a smart phone, a mobile phone, a smart watch, a wearable device, a tablet computer, a laptop computer, a dedicated portable satellite navigation device, a vehicle-based satellite navigation device, or other satellite navigation device, and/or the like (as described above with respect to FIG. 1, or the like). Although FIG. 4 is depicted as a computing system of the user device performing the various processes of method 400, the various embodiments are not so limited, and these various processes of method 400 may be performed by logic of a semiconductor package that is disposed with the user device, where (as described above with respect to FIG. 1) the logic may either embody at least one of the the MTC, the GP, the PD, the PPE, the ME, the PE, the GPU(s), the CPU(s), and/or the DSP, or the like, or may perform functions of the at least one of the the MTC, the GP, the PD, the PPE, the ME, the PE, the GPU(s), the CPU(s), and/or the DSP, or the like.

Figure 4D:
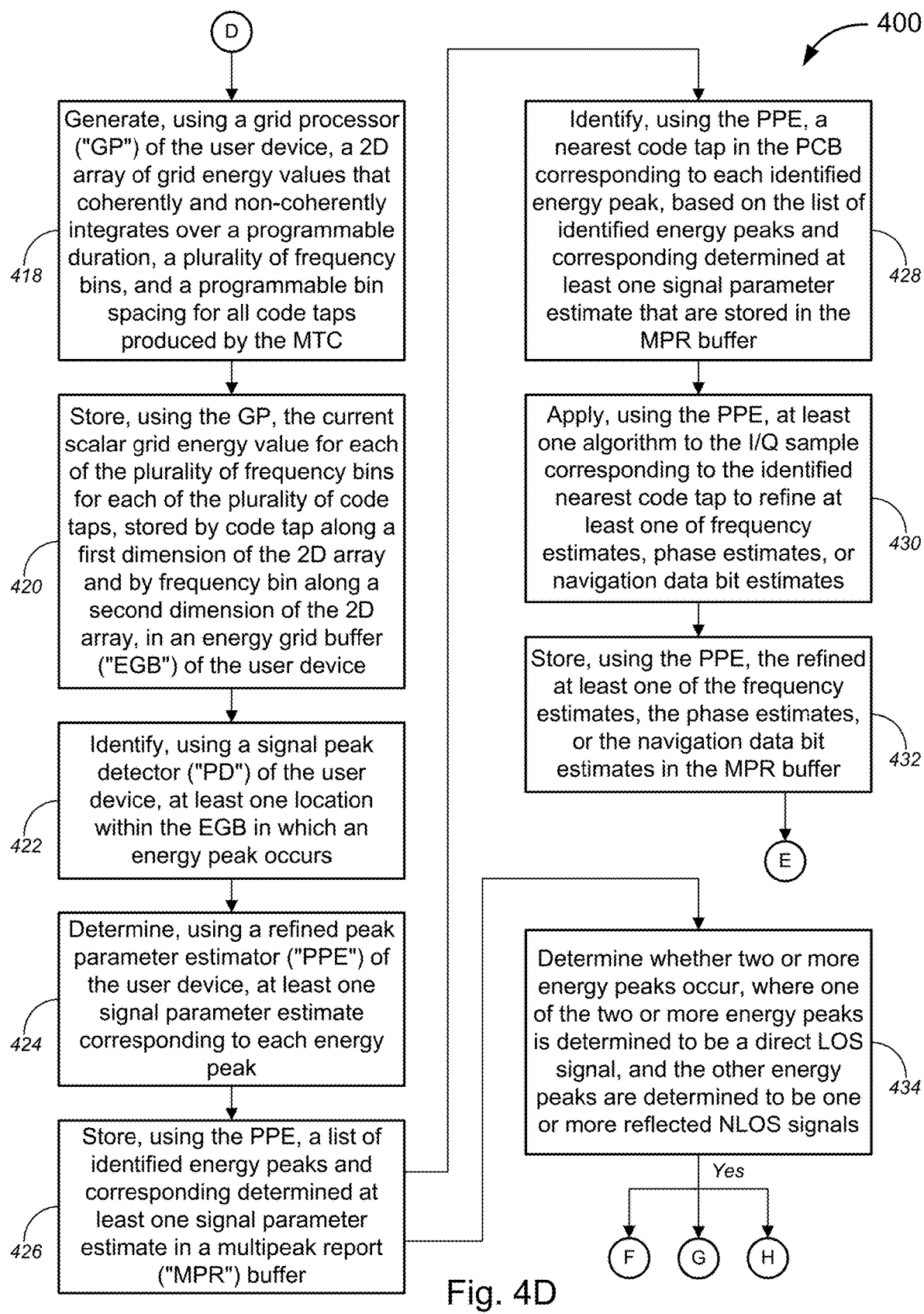
Figure 4E:
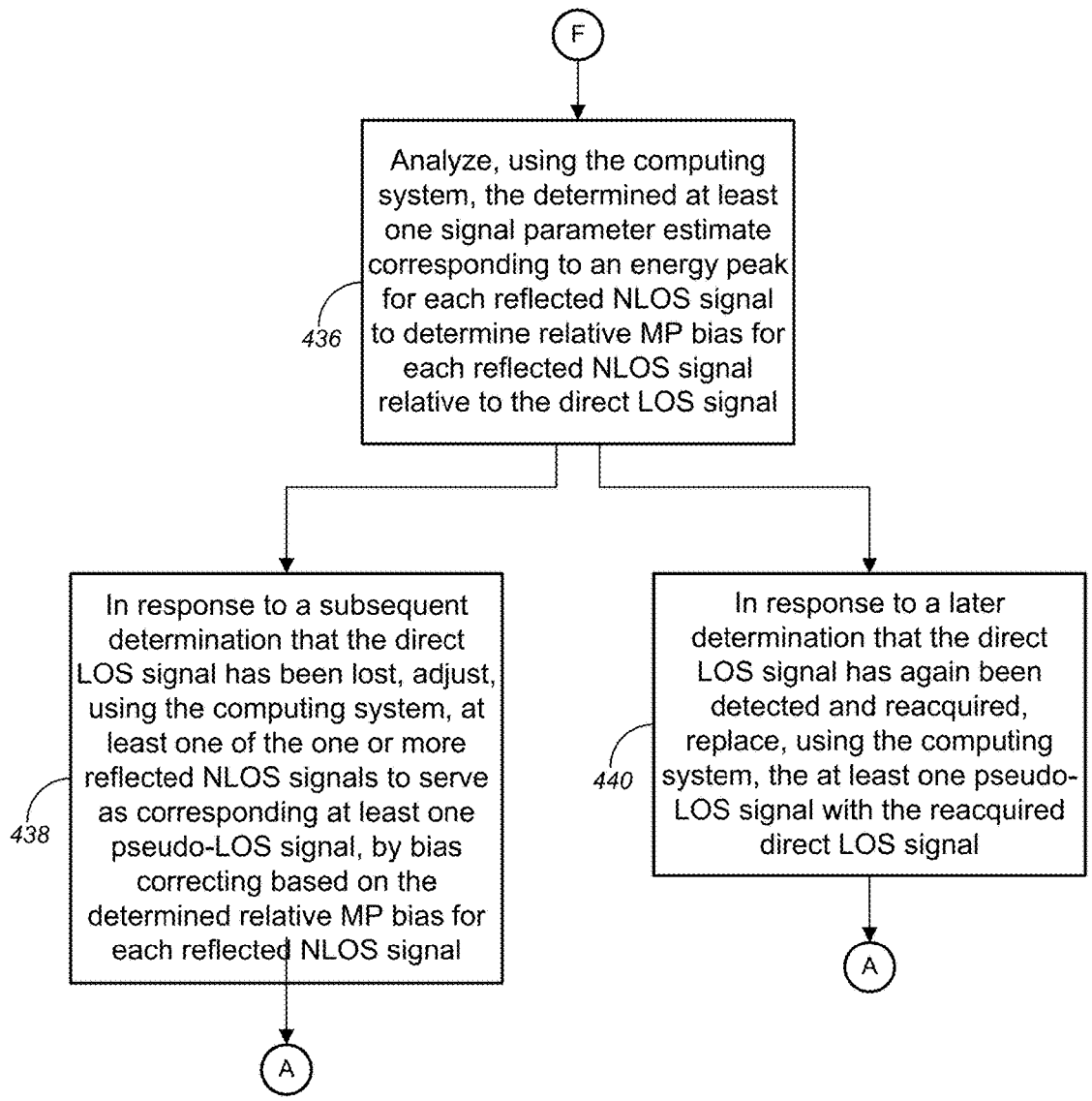
Figure 4F:
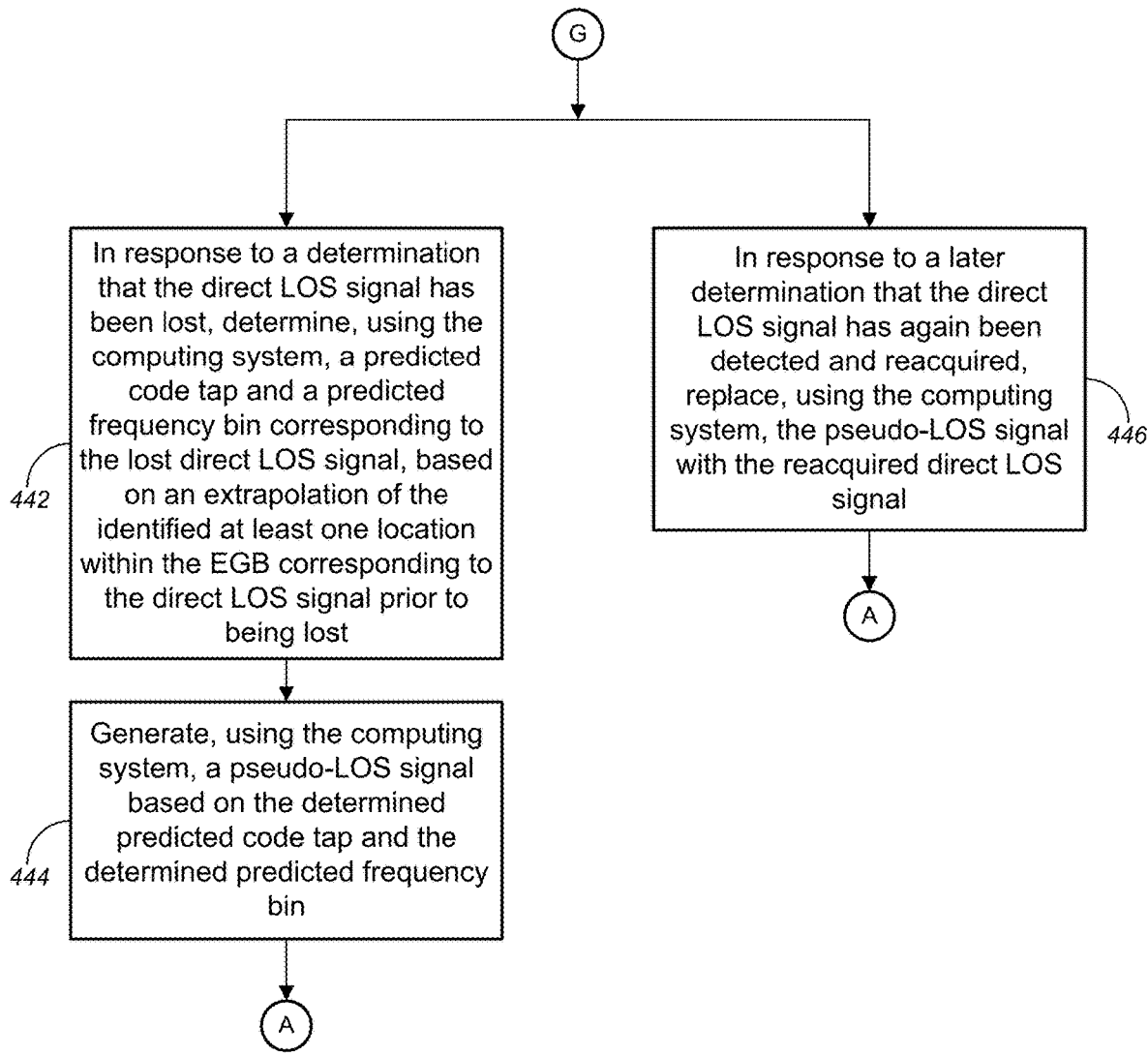
Figure 4I:
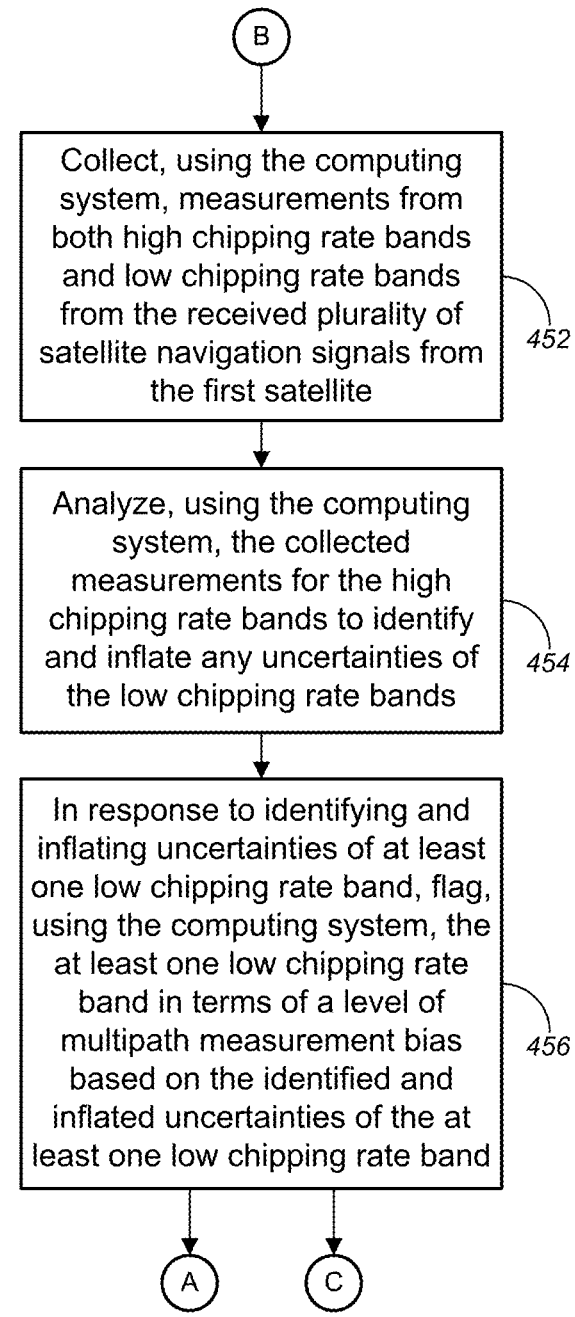

Method 400 continues onto one of the process at block 404, the process at block 412 in FIG. 4C following the circular marker denoted, "A," or the process at block 452 in FIG. 4I following the circular marker denoted, "B."

At block 404, method 400 comprises identifying, using the computing system, two or more signal peaks that fall within a tracking aperture spanning a first set of code delay values along a first dimension and a first set of frequency offset values along a second dimension based on analysis of a plurality of signals received from a first satellite. The identified two or more signal peaks correspond to two or more signals, among the plurality of signals, whose relative code delay and relative frequency offset fall within the first set of code delay values and the first set of frequency offset values of the tracking aperture. In some cases, the plurality of signals includes, without limitation, global navigation satellite system ("GNSS") signals, wherein the signal parameters from the received plurality of signals includes, but are not limited to, at least one of signal power, code delay, carrier phase, carrier frequency, or data bits, and/or the like.

Method 400 further comprises, at block 406, determining, using the computing system, one or more peak parameter estimates for each of the at least one signal peak based on measurement of signal parameters from at least one signal peak among the identified two or more signal peaks. Method 400 either continues onto the process at block 408 or continues onto the process at block 450 in FIG. 4H following the circular marker denoted, "I."

At block 450 in FIG. 4H (following the circular marker denoted, "I"), method 400 comprises determining, using the computing system, whether one of the two or more signals is at least one of an earliest detected signal or a strongest detected signal following the earliest detected signal, where the at least one of an earliest detected signal or a strongest detected signal following the earliest detected signal corresponds to the at least one signal peak. Method 400 returns to the process at block 408 in FIG. 4A or block 408' in FIG. 4J following the circular marker denoted, "E."

At block 408, method 400 comprises providing, using the computing system, the determined one or more peak parameter estimates for each of the at least one signal peak to a position engine ("PE") of the user device that is configured to calculate a navigation solution for the user device based at least in part on the determined one or more peak parameter estimates. Method 400 further comprises calculating, using the PE of the user device, the navigation solution for the user device based on the determined one or more peak parameter estimates for each of the at least one signal peak (block 410). In some embodiments, the navigation solution includes, without limitation, at least one of a position solution, a velocity solution, or a time solution for the user device, and/or the like. Method 400 loops back to the process at block 402.

Figure 4J:
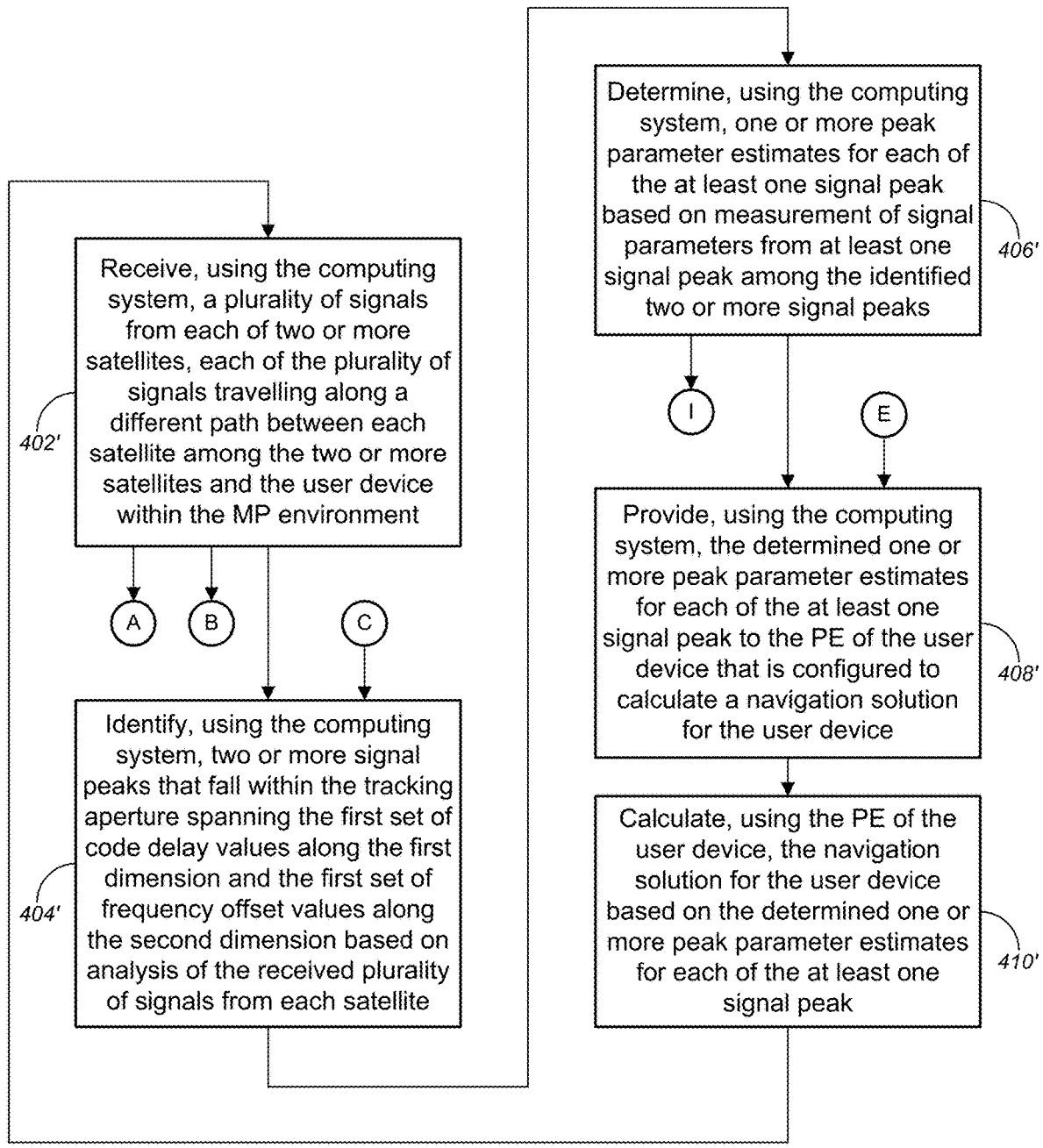

Alternatively, referring to the non-limiting embodiment of FIG. 4J, in the case that the user device communicatively couples with two or more satellites, method 400, at block 402', comprises receiving, using the computing system, plurality of signals from each of the two or more satellites, each of the plurality of signals travelling along a different path between each satellite among the two or more satellites and the user device within the MP environment. Method 400 continues onto one of the process at block 404', the process at block 412 in FIG. 4C following the circular marker denoted, "A," or the process at block 452 in FIG. 4I following the circular marker denoted, "B."

At block 404', method 400 comprises identifying, using the computing system, two or more signal peaks that fall within the tracking aperture spanning the first set of code delay values along the first dimension and the first set of frequency offset values along the second dimension based on analysis of the received plurality of signals from each satellite, the identified two or more signal peaks corresponding to two or more signals, among the plurality of signals, for each satellite that are correlated with two or more signals, among the plurality of signals, for other satellites among the two or more satellites.

Method 400 further comprises, at block 406', concurrently measuring, using the computing system, signal parameters from at least one signal peak among the identified two or more signal peaks to determining, using the computing system, one or more peak parameter estimates for each of the at least one signal peak based on measurement of signal parameters from at least one signal peak among the identified two or more signal peaks. Method 400 either continues onto the process at block 408 or continues onto the process at block 450 in FIG. 4H following the circular marker denoted, "I."

At block 408', method 400 comprises providing, using the computing system, the determined one or more peak parameter estimates for each of the at least one signal peak to the PE of the user device that is configured to calculate a navigation solution for the user device. Method 400 further comprises calculating, using the PE of the user device, the current geographical location of the user device based on the data associated with the identified direct LOS signal (block 410'). Method 400 loops back to the process at block 402'.

In some embodiments, with reference to the non-limiting embodiment of FIG. 4B, concurrently receiving the plurality of signals (at block 402) comprises: receiving the plurality of signals from the first satellite via an antenna of the user device (block 402a); filtering, frequency downconverting to an intermediate frequency ("IF"), and conditioning (collectively, "signal processing") the plurality of signals using a front-end ("FE") block of the user device (block 402b); storing the plurality of signals that are output from the FE block in a sample buffer (block 402c); and retrieving the plurality of signals from the sample buffer (block 402d). Method 400 continues onto the process at block 412 in FIG. 4C following the circular marker denoted, "A."

At block 412 in FIG. 4C (following the circular marker denoted, "A"), method 400 comprises frequency shifting, using a multitap correlator ("MTC") of the user device, each signal, among the plurality of signals, to a baseband frequency. Method 400, at block 414, comprises convolving, using the MTC, each frequency shifted signal with a pseudorandom number ("PRN") code sequence associated with the first satellite to generate a time sequenced in-phase and quadrature ("I/Q") stream. In some cases, the time sequenced baseband I/Q stream includes, but is not limited to, a plurality of I/Q sample streams with each I/Q sample stream being code phase shifted from a central or prompt phase (also referred to as "prompt tap" or the like) by multiples of a tap spacing. In some instances, the tap spacing corresponds to a code delay based on the PRN code sequence. In some cases, the multiples of the tap spacing collectively correspond to a plurality of code taps, which are defined by a plurality of PRN code offsets. In some instances, each I/Q sample stream corresponds to code phase shifted I/Q signals over a predetermined integration ("PDI") time (also referred to as "post correlation sample index" or the like). Method 400 further comprises storing, using the MTC, the generated time sequenced baseband I/Q stream for each frequency shifted signal as a two-dimensional ("2D") array of I/Q samples (also referred to as "complex baseband post correlation samples" or the like), stored by code tap along a first dimension of the 2D array and by post correlation sample index along a second dimension of the 2D array, in a post correlation buffer ("PCB") of the user device (block 416). Method 400 continues onto the process at block 418 in FIG. 4D following the circular marker denoted, "D."

At block 418 in FIG. 4D (following the circular marker denoted, "D"), method 400 comprises generating, using a grid processor ("GP") of the user device, a 2D array of grid energy values that coherently and non-coherently integrates over a programmable duration, a plurality of frequency bins, and a programmable bin spacing for all code taps produced by the MTC, in some cases, by implementing a three-level iteration loop comprising an outermost loop, an intermediate level loop, and an innermost loop. In some embodiments, implementing the three-level iteration loop comprises repeating the following for each of the plurality of frequency bins for each of the plurality of code taps: using the outermost loop to select a code tap, among the plurality of code taps that is stored in the PCB, to input into the GP; using the intermediate level loop to select a bin frequency to apply to the selected code tap; and using the innermost loop to process an I/Q sample stream corresponding to the selected code tap through the GP to produce a current scalar grid energy value for the selected code tap and the selected frequency bin. Method 400 further comprises, at block 420, storing (or storing and accumulating), using the GP, the current scalar grid energy value for each of the plurality of frequency bins for each of the plurality of code taps, stored by code tap along a first dimension of the 2D array and by frequency bin along a second dimension of the 2D array, in an energy grid buffer ("EGB") of the user device.

According to some embodiments, method 400 further comprises identifying, using a signal peak detector ("PD") of the user device, at least one location within the EGB in which an energy peak occurs (block 422). In some instances, each energy peak corresponds to a current scalar grid energy value that exceeds a predetermined energy threshold value (for example, but not limited to, a signal to noise ratio ("SNR") value greater than 10%, or the like). In some cases, each identified location among the at least one location within the EGB corresponds to a code tap and a frequency bin associated with each energy peak. At block 424, method 400 comprises determining, using a peak parameter estimator ("PPE") of the user device, at least one signal parameter estimate corresponding to each energy peak. In some instances, the at least one signal parameter estimate comprises at least one of a peak coarse frequency estimate, a refined peak code phase estimate using peak fit, or a refined peak signal strength ("C/N$_o$") estimate, and/or the like. Method 400 further comprises storing, using the PPE, a list of identified energy peaks and corresponding determined at least one signal parameter estimate in a multipeak report ("MPR") buffer (block 426). Method 400 continues onto either the process at block 428 or the process at block 434.

At block 428, method 400 comprises identifying, using the PPE, a nearest code tap in the PCB corresponding to each identified energy peak, based on the list of identified energy peaks and corresponding determined at least one signal parameter estimate that are stored in the MPR buffer. Method 400, at block 430, comprises, applying, using the PPE, at least one algorithm to the I/Q sample corresponding to the identified nearest code tap to refine at least one of frequency estimates, phase estimates, or navigation data bit estimates, and/or the like. In some instances, the at least one algorithm includes, but is not limited to, at least one of a phase lock loop ("PLL") algorithm, a frequency lock loop ("FLL") algorithm, or an open loop lag-N complex cross product algorithm, and/or the like. Method 400 further comprises storing, using the PPE, the refined at least one of the frequency estimates, the phase estimates, or the navigation data bit estimates, and/or the like, in the MPR buffer (block 432). In such cases, providing the determined one or more peak parameter estimates for each of the at least one signal peak to the PE (at block 408 in FIG. 4A) comprises sending, using the PPE, the refined at least one of the frequency estimates, the phase estimates, or the navigation data bit estimates, and/or the like, to the PE. Method 400 returns to the process at block 408 in FIG. 4A or at block 408' in FIG. 4J following the circular marker denoted, "E."

Alternatively, or additionally, at block 434, method 400 comprises determining whether two or more energy peaks occur, where one of the two or more energy peaks is determined to be a direct line-of-sight ("LOS") signal, and where the other energy peaks among the two or more energy peaks are determined to be one or more reflected non-line-of-sight ("NLOS") signals. If so, method 400 continues onto one of the process at block 436 in FIG. 4E following the circular marker denoted, "F," the process at block 442 or at block 446 in FIG. 4F following the circular marker denoted, "G," or the process at block 448 in FIG. 4G following the circular marker denoted, "H."

At block 436 in FIG. 4E (following the circular marker denoted, "F"), method 400 comprises analyzing, using the computing system, the determined at least one signal parameter estimate corresponding to an energy peak for each reflected NLOS signal to determine relative MP bias for each reflected NLOS signal relative to the direct LOS signal. Method 400 continues to either the process at block 438 or the process at block 440.

At block 438, method 400 comprises, in response to a subsequent determination that the direct LOS signal has been lost, adjusting, using the computing system, at least one of the one or more reflected NLOS signals to serve as corresponding at least one pseudo-LOS signal, by bias correcting based on the determined relative MP bias for each reflected NLOS signal. Method 400 returns to the process at block 412 in FIG. 4C following the circular marker denoted, "A."

Alternatively, at block 440, method 400 comprises, in response to a later determination that the direct LOS signal has again been detected and reacquired, replacing, using the computing system, the at least one pseudo-LOS signal with the reacquired direct LOS signal. Method 400 returns to the process at block 412 in FIG. 4C following the circular marker denoted, "A."

At block 442 in FIG. 4F (following the circular marker denoted, "G"), method 400 comprises, in response to a determination that the direct LOS signal has been lost, determining, using the computing system, a predicted code tap and a predicted frequency bin corresponding to the lost direct LOS signal, based on an extrapolation of the identified at least one location within the EGB corresponding to the direct LOS signal prior to being lost, and generating, using the computing system, a pseudo-LOS signal based on the determined predicted code tap and the determined predicted frequency bin (block 444). Method 400 returns to the process at block 412 in FIG. 4C following the circular marker denoted, "A."

Alternatively, at block 446 in FIG. 4F (following the circular marker denoted, "G"), method 400 comprises, in response to a later determination that the direct LOS signal has again been detected and reacquired, replacing, using the computing system, the pseudo-LOS signal with the reacquired direct LOS signal. Method 400 returns to the process at block 412 in FIG. 4C following the circular marker denoted, "A."

At block 448 in FIG. 4G (following the circular marker denoted, "H"), method 400 comprises calculating, using the computing system, at least one of a LOS pseudorange between the user device and the first satellite, a Doppler shift for the identified direct LOS signal from the first satellite, or a phase of a carrier signal of the direct LOS signal from the first satellite, based at least in part on the measured signal parameters associated with the direct LOS signal. In some cases, the determined one or more peak parameter estimates for each of the at least one signal peak includes, without limitation, the calculated at least one of the LOS pseudorange, the Doppler shift for the identified direct LOS signal, or the phase of the carrier signal of the direct LOS signal, and/or the like. Method 400 returns to the process at block 412 in FIG. 4C following the circular marker denoted, "A."

At block 452 in FIG. 4I (following the circular marker denoted, "B"), method 400 comprises collecting, using the computing system, measurements from both high chipping rate bands and low chipping rate bands from the received plurality of signals from the first satellite. Method 400 further comprises, at block 454, analyzing, using the computing system, the collected measurements for the high chipping rate bands to identify and inflate any uncertainties of the low chipping rate bands. Method 400 further comprises, in response to identifying and inflating uncertainties of at least one low chipping rate band, flagging, using the computing system, the at least one low chipping rate band in terms of a level of multipath measurement bias based on the identified and inflated uncertainties of the at least one low chipping rate band (block 456). Method 400 returns to either the process at block 412 in FIG. 4C following the circular marker denoted, "A," or the process at block 404 in FIG. 4A or at block 404' in FIG. 4J following the circular marker denoted, "C."

Examples of System and Hardware Implementation

Figure 5:
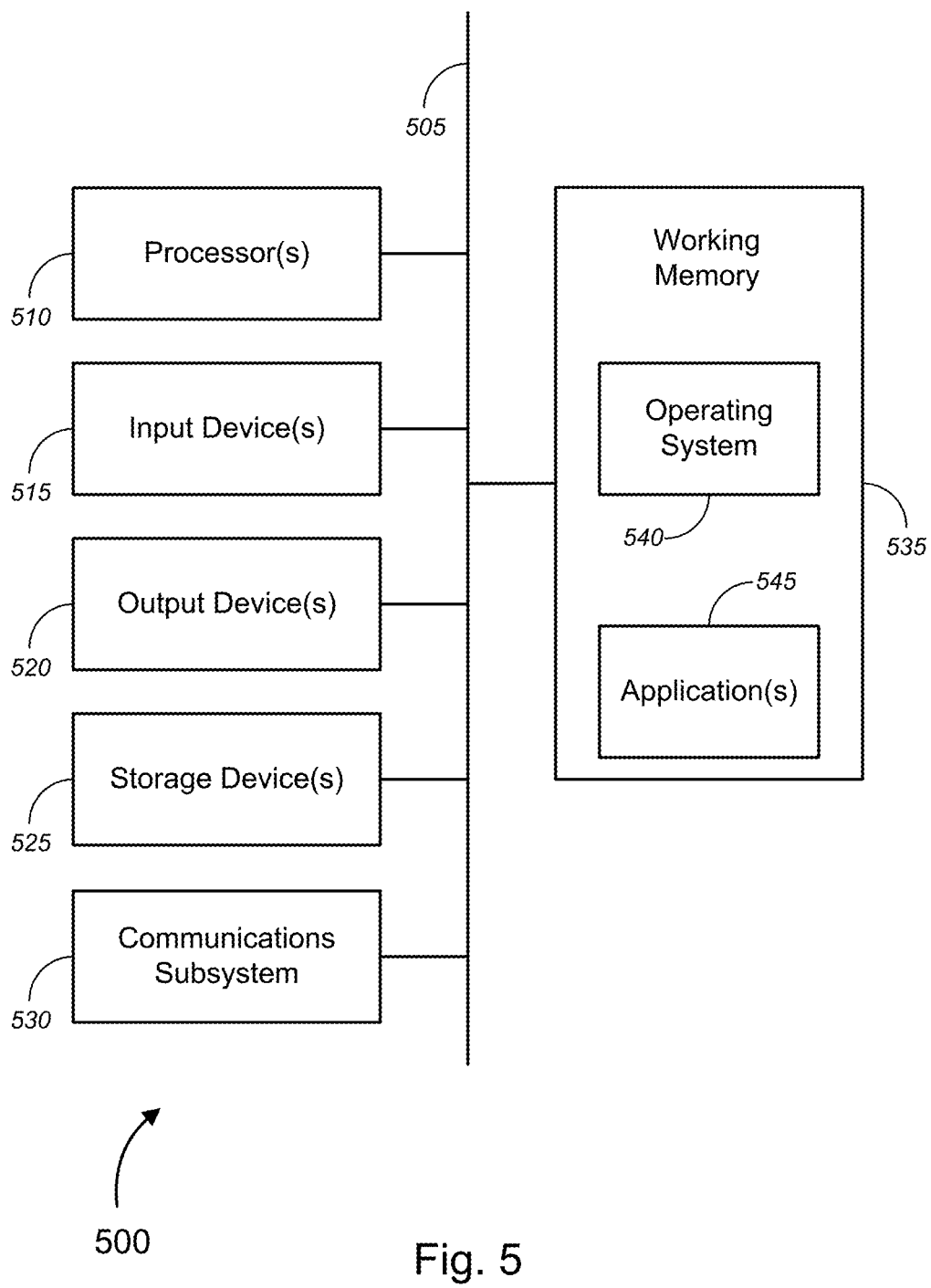
FIG. 5 is a block diagram illustrating an example of computer or system hardware architecture, in accordance with various embodiments.

FIG. 5 is a block diagram illustrating an example of computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., user device 105, computing system 110, display screen 130, audio playback device 135, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., user device 105, computing system 110, display screen 130, audio playback device 135, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with particular requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in some fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While particular features and aspects have been described with respect to some embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while particular functionality is ascribed to particular system components, unless the context dictates otherwise, this functionality need not be limited to such and can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—particular features for ease of description and to illustrate some aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A semiconductor package disposed within a user device, the semiconductor package comprising logic that is configured to:
   identify two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the user device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture;
   determine one or more peak parameter estimates for each of at least one signal peak based on measurement of signal parameters from the at least one signal peak among the identified two or more signal peaks;
   provide the determined one or more peak parameter estimates for each of the at least one signal peak to a position engine ("PE") of the user device that is configured to calculate a navigation solution for the user device based at least in part on the determined one or more peak parameter estimates;
   store or store and accumulate a current scalar grid energy value for each of plurality of frequency bins for each of the plurality of code taps, stored by code tap along a first dimension of the 2D array and by frequency bin along a second dimension of the 2D array, in an energy grid buffer ("EGB") of the satellite navigation device; and
   based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, and in response to a determination that the direct LOS signal has been lost, determine a predicted code tap and a predicted frequency bin corresponding to the lost direct LOS signal, based on an extrapolation of the identified at least one location within the EGB corresponding to the direct LOS signal prior to being lost, and generate a pseudo-LOS signal based on the determined predicted code tap and the determined predicted frequency bin.

2. The semiconductor package of claim 1, wherein the logic is further configured to:
   frequency shift each satellite signal, among the plurality of satellite signals, to a baseband frequency;
   convolve each frequency shifted satellite signal with a pseudo-random number ("PRN") code sequence associated with the first satellite to generate a time sequenced in-phase and quadrature ("I/Q") stream, wherein the time sequenced baseband I/Q stream comprises a plurality of I/Q sample streams with each I/Q sample stream being code phase shifted from a central or prompt phase by multiples of a tap spacing, wherein the tap spacing corresponds to a code delay based on the PRN code sequence, wherein the multiples of the tap spacing collectively correspond to a plurality of code taps, which are defined by a plurality of PRN code offsets, wherein each I/Q sample stream corresponds to code phase shifted I/Q signals over a predetermined integration ("PDI") time; and
   store the generated time sequenced baseband I/Q stream for each frequency shifted signal as a two-dimensional ("2D") array of I/Q samples, stored by code tap along a first dimension of the 2D array and by post correlation sample index along a second dimension of the 2D array, in a post correlation buffer ("PCB") of the satellite navigation device.

3. The semiconductor package of claim 2, wherein the logic is further configured to:
   generate a 2D array of grid energy values that coherently and non-coherently integrates over a programmable duration, a plurality of frequency bins, and a programmable bin spacing for all code taps produced by an MTC, by implementing a three-level iteration loop comprising an outermost loop, an intermediate level loop, and an innermost loop, wherein implementing the three-level iteration loop comprises repeating the following for each of the plurality of frequency bins for each of the plurality of code taps:
     using the outermost loop to select a code tap, among the plurality of code taps that is stored in the PCB, to input into the GP;
     using the intermediate level loop to select a bin frequency to apply to the selected code tap; and
     using the innermost loop to process an I/Q sample stream corresponding to the selected code tap through the GP to produce a current scalar grid energy value for the selected code tap and the selected frequency bin.

4. The semiconductor package of claim 3, wherein the logic is further configured to:

identify at least one location within the EGB in which an energy peak occurs, wherein each energy peak corresponds to a current scalar grid energy value that exceeds a predetermined energy threshold value, wherein each identified location among the at least one location within the EGB corresponds to a code tap and a frequency bin associated with each energy peak;

determine at least one signal parameter estimate corresponding to each energy peak, the at least one signal parameter estimate comprising at least one of a peak coarse frequency estimate, a refined peak code phase estimate using peak fit, or a refined peak signal strength ("$CN_o$") estimate; and store a list of identified energy peaks and corresponding determined at least one signal parameter estimate in a multipeak report ("MPR") buffer.

5. The semiconductor package of claim 4, wherein the logic is further configured to:

identify a nearest code tap in the PCB corresponding to each identified energy peak, based on the list of identified energy peaks and corresponding determined at least one signal parameter estimate that are stored in the MPR buffer;

apply at least one algorithm to the I/Q sample corresponding to the identified nearest code tap to refine at least one of frequency estimates, phase estimates, or navigation data bit estimates, wherein the at least one algorithm comprises at least one of a phase lock loop ("PLL") algorithm, a frequency lock loop ("FLL") algorithm, or an open loop lag-N complex cross product algorithm; and store the refined at least one of the frequency estimates, the phase estimates, or the navigation data bit estimates in the MPR buffer, wherein the refined at least one of the frequency estimates, the phase estimates, or the navigation data bit estimates in the MPR buffer corresponds to the one or more peak parameter estimates;

wherein providing the determined one or more peak parameter estimates for each of the at least one signal peak to the PE comprises sending the refined at least one of the frequency estimates, the phase estimates, or the navigation data bit estimates to the PE.

6. The semiconductor package of claim 5, wherein, based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, the logic is further configured to:

analyze the determined at least one signal parameter estimate corresponding to an energy peak for each reflected NLOS signal to determine relative MP bias for each reflected NLOS signal relative to the direct LOS signal;

in response to a subsequent determination that the direct LOS signal has been lost, adjust at least one of the one or more reflected NLOS signals to serve as corresponding at least one pseudo-LOS signal, by bias correcting based on the determined relative MP bias for each reflected NLOS signal; and in response to a later determination that the direct LOS signal has again been detected and reacquired, replace the at least one pseudo-LOS signal with the reacquired direct LOS signal.

7. The semiconductor package of claim 6, wherein, based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, the logic is further configured to:

in response to a later determination that the direct LOS signal has again been detected and reacquired, replace the pseudo-LOS signal with the reacquired direct LOS signal.

8. The semiconductor package of claim 1, wherein the plurality of signals comprises global navigation satellite system ("GNSS") signals, wherein the signal parameters from the received plurality of signals comprise at least one of signal power, code delay, carrier phase, carrier frequency, or data bits.

9. The semiconductor package of claim 1, wherein the logic is further configured to:

determine whether one of the two or more signals is a direct line-of-sight ("LOS") signal instead of one or more reflected non-line-of-sight ("NLOS") signals received from the first satellite; and calculate at least one of a LOS pseudorange between the user device and the first satellite, a Doppler shift for the identified direct LOS signal from the first satellite, or a phase of a carrier signal of the direct LOS signal from the first satellite, based at least in part on the measured signal parameters associated with the direct LOS signal;

wherein the determined one or more peak parameter estimates for each of the at least one signal peak comprise the calculated at least one of the LOS pseudorange, the Doppler shift for the identified direct LOS signal, or the phase of the carrier signal of the direct LOS signal.

10. The semiconductor package of claim 1, wherein the logic is further configured to:

determine whether one of the two or more satellite signals is at least one of an earliest detected signal or a strongest detected signal following the earliest detected signal, wherein the at least one of an earliest detected signal or a strongest detected signal following the earliest detected signal corresponds to the at least one signal peak.

11. The semiconductor package of claim 1, wherein the user device communicatively couples with two or more satellites, wherein identifying the two or more signal peaks that fall within the tracking aperture comprises identifying two or more signal peaks that fall within the tracking aperture spanning the first set of code delay values along the first dimension and the first set of frequency offset values along the second dimension based on analysis of a plurality of satellite signals received from each of the two or more satellites, each of the plurality of satellite signals travelling along a different path between each satellite among the two or more satellites and the user device within the MP environment, the identified two or more signal peaks corresponding to two or more satellite signals, among the plurality of satellite signals, for each satellite that are correlated with two or more satellite signals, among the plurality of satellite signals, for other satellites among the two or more satellites.

12. The semiconductor package of claim 1, wherein the logic is further configured to:

collect measurements from both high chipping rate bands and low chipping rate bands from the received plurality of satellite signals from the first satellite;

analyze the collected measurements for the high chipping rate bands to identify and inflate any uncertainties of the low chipping rate bands; and in response to identifying and inflating uncertainties of at least one low chipping rate band, flag the at least one low chipping rate band in terms of a level of multipath measurement bias based on the identified and inflated uncertainties of the at least one low chipping rate band.

13. The semiconductor package of claim 1, wherein the plurality of signals is continuously received from the first satellite, and wherein identifying the two or more signal peaks, determining the one or more peak parameters, and providing the determined one or more peak parameter estimates for each of the at least one signal peak to the PE are performed continuously over time.

14. A method, comprising:

identifying, using a computing system of a user device, two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the user device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture;

determining, using the computing system, one or more peak parameter estimates for each of at least one signal peak based on measurement of signal parameters from the at least one signal peak among the identified two or more signal peaks;

providing, using the computing system, the determined one or more peak parameter estimates for each of the at least one signal peak to a position engine ("PE") of the user device that is configured to calculate a navigation solution for the user device based at least in part on the determined one or more peak parameter estimates;

storing or storing and accumulating a current scalar grid energy value for each of plurality of frequency bins for each of the plurality of code taps, stored by code tap along a first dimension of the 2D array and by frequency bin along a second dimension of the 2D array, in an energy grid buffer ("EGB") of the satellite navigation device; and based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, and in response to a determination that the direct LOS signal has been lost, determining a predicted code tap and a predicted frequency bin corresponding to the lost direct LOS signal, based on an extrapolation of the identified at least one location within the EGB corresponding to the direct LOS signal prior to being lost, and generate a pseudo-LOS signal based on the determined predicted code tap and the determined predicted frequency bin.

15. The method of claim 14, wherein the computing system comprises at least one of a multitap correlator ("MTC"), a grid processor ("GP"), a signal peak detector ("PD"), a peak parameter estimator ("PPE"), a measurement engine ("ME"), a digital signal processor ("DSP"), or other processor.

16. The method of claim 14, further comprising:

frequency shifting, using the computing system, each signal, among the plurality of signals, to a baseband frequency;

convolving, using the computing system, each frequency shifted signal with a pseudo-random number ("PRN") code sequence associated with the first satellite to generate a time sequenced baseband in-phase and quadrature ("I/Q") stream, wherein the time sequenced baseband I/Q stream comprises a plurality of I/Q sample streams with each I/Q sample stream being code phase shifted from a central or prompt phase by multiples of a tap spacing, wherein the tap spacing corresponds to a code delay based on the PRN code sequence, wherein the multiples of the tap spacing collectively correspond to a plurality of code taps, which are defined by a plurality of PRN code offsets, wherein each I/Q sample stream corresponds to code phase shifted I/Q signals over a predetermined integration ("PDI") time; and storing, using the computing system, the generated time sequenced baseband I/Q stream for each frequency shifted signal as a two-dimensional ("2D") array of I/Q samples, stored by code tap along a first dimension of the 2D array and by post correlation sample index along a second dimension of the 2D array, in a post correlation buffer ("PCB") of the user device.

17. The method of claim 16, further comprising:

generating, using the computing system, a 2D array of grid energy values that coherently and non-coherently integrates over a programmable duration, a plurality of frequency bins, and a programmable bin spacing for all code taps produced by the computing system, by implementing a three-level iteration loop comprising an outermost loop, an intermediate level loop, and an innermost loop, wherein implementing the three-level iteration loop comprises repeating the following for each of the plurality of frequency bins for each of the plurality of code taps:

using the outermost loop to select a code tap, among the plurality of code taps that is stored in the PCB;

using the intermediate level loop to select a bin frequency to apply to the selected code tap; and using the innermost loop to process an I/Q sample stream corresponding to the selected code tap to produce a current scalar grid energy value for the selected code tap and the selected frequency bin; and storing or storing and accumulating, using the computing system, the current scalar grid energy value for each of the plurality of frequency bins for each of the plurality of code taps, stored by code tap along a first dimension of the 2D array and by frequency bin along a second dimension of the 2D array, in an energy grid buffer ("EGB") of the user device.

18. The method of claim 17, further comprising:

identifying, using the computing system, at least one location within the EGB in which an energy peak occurs, wherein each energy peak corresponds to a current scalar grid energy value that exceeds a predetermined energy threshold value, wherein each identified location among the at least one location within the EGB corresponds to a code tap and a frequency bin associated with each energy peak, wherein the energy peak corresponds to each of the at least one signal peak, wherein the code tap and the frequency bin associated with each energy peak corresponds to the relative code delay and the relative frequency offset, respectively, of a signal, among the two or more signals, corresponding to each of the at least one signal peak;

determining, using the computing system, at least one signal parameter estimate corresponding to each energy peak, the at least one signal parameter estimate comprising at least one of a peak coarse frequency estimate, a refined peak code phase estimate using peak fit, or a refined peak signal strength ("$C/N_o$") estimate; and storing, using the computing system, a list of identified energy peaks and corresponding determined at least one signal parameter estimate in a multipeak report ("MPR") buffer.

19. The method of claim 18, further comprising:

identifying, using the computing system, a nearest code tap in the PCB corresponding to each identified energy peak, based on the list of identified energy peaks and corresponding determined at least one signal parameter estimate that are stored in the MPR buffer;

applying, using the computing system, at least one algorithm to the I/Q sample corresponding to the identified nearest code tap to refine at least one of frequency estimates, phase estimates, or navigation data bit estimates, wherein the at least one algorithm comprises at least one of a phase lock loop ("PLL") algorithm, a frequency lock loop ("FLL") algorithm, or an open loop lag-N complex cross product algorithm; and storing, using the computing system, the refined at least one of the frequency estimates, the phase estimates, or the navigation data bit estimates in the MPR buffer, wherein the refined at least one of the frequency estimates, the phase estimates, or the navigation data bit estimates in the MPR buffer corresponds to the one or more peak parameter estimates;

wherein providing the determined one or more peak parameter estimates for each of the at least one signal peak to the PE comprises sending, using the computing system, the refined at least one of the frequency estimates, the phase estimates, or the navigation data bit estimates to the PE.

20. A satellite navigation device, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

identify two or more signal peaks that fall within a tracking aperture spanning a first set of code delay values along a first dimension and a first set of frequency offset values along a second dimension based on analysis of a plurality of signals received from a first satellite, each of the plurality of signals travelling along a different path between the first satellite and the satellite navigation device within a multipath ("MP") environment, the identified two or more signal peaks corresponding to two or more signals, among the plurality of signals, whose relative code delay and relative frequency offset fall within the first set of code delay values and the first set of frequency offset values of the tracking aperture;

determine one or more peak parameter estimates for each of at least one signal peak based on measurement of signal parameters from the at least one signal peak among the identified two or more signal peaks;

provide the determined one or more peak parameter estimates for each of the at least one signal peak to a position engine ("PE") of the satellite navigation device that is configured to calculate a navigation solution for the satellite navigation device based at least in part on the determined one or more peak parameter estimates;

store or store and accumulate a current scalar grid energy value for each of plurality of frequency bins for each of the plurality of code taps, stored by code tap along a first dimension of the 2D array and by frequency bin along a second dimension of the 2D array, in an energy grid buffer ("EGB") of the satellite navigation device; and based on a determination that two or more energy peaks occur, that one of the two or more energy peaks is determined to be a direct line-of-sight ("LOS") signal, and that the other energy peaks among the two or more energy peaks are determined to be one or more reflected non-line-of-sight ("NLOS") signals, and in response to a determination that the direct LOS signal has been lost, determine a predicted code tap and a predicted frequency bin corresponding to the lost direct LOS signal, based on an extrapolation of the identified at least one location within the EGB corresponding to the direct LOS signal prior to being lost, and generate a pseudo-LOS signal based on the determined predicted code tap and the determined predicted frequency bin.

* * * * *